US 11,548,793 B2

(12) United States Patent
Chakrabarty et al.

(10) Patent No.: US 11,548,793 B2
(45) Date of Patent: Jan. 10, 2023

(54) SYNTHESIS OF AEROSOL GELS COMPRISING MACRO-AGGREGATES IN A BUOYANCY-OPPOSED FLAME REACTOR BY A DIFFUSION-LIMITING CLUSTER AGGREGATING PROCESS

(71) Applicant: Washington University, St. Louis, MO (US)

(72) Inventors: Rajan K. Chakrabarty, St. Louis, MO (US); Pai Liu, St. Louis, MO (US)

(73) Assignee: Washington University, St. Louis, MO (US)

( * ) Notice: Subject to any disclaimer, the term of this patent is extended or adjusted under 35 U.S.C. 154(b) by 853 days.

(21) Appl. No.: 16/341,825

(22) PCT Filed: Oct. 19, 2017

(86) PCT No.: PCT/US2017/057308
§ 371 (c)(1),
(2) Date: Apr. 12, 2019

(87) PCT Pub. No.: WO2018/075725
PCT Pub. Date: Apr. 26, 2018

(65) Prior Publication Data
US 2021/0246045 A1 Aug. 12, 2021

Related U.S. Application Data

(60) Provisional application No. 62/410,012, filed on Oct. 19, 2016.

(51) Int. Cl.
| | | |
|---|---|---|
| *C01G 23/00* | (2006.01) | |
| *C01G 23/07* | (2006.01) | |
| *B01J 13/00* | (2006.01) | |
| *B82Y 30/00* | (2011.01) | |
| *B82Y 40/00* | (2011.01) | |

(52) U.S. Cl.
CPC .......... *C01G 23/07* (2013.01); *B01J 13/0095* (2013.01); *B82Y 30/00* (2013.01); *B82Y 40/00* (2013.01); *C01P 2002/72* (2013.01); *C01P 2002/84* (2013.01); *C01P 2002/85* (2013.01); *C01P 2004/03* (2013.01); *C01P 2004/50* (2013.01); *C01P 2004/61* (2013.01); *C01P 2004/64* (2013.01); *C01P 2006/10* (2013.01)

(58) Field of Classification Search
CPC ..... C01G 23/07; B82Y 40/00; C01P 2004/50; C01P 2004/61; C01P 2006/10; B01J 13/0095
See application file for complete search history.

(56) References Cited

U.S. PATENT DOCUMENTS

| | | | |
|---|---|---|---|
| 5,876,683 A | 3/1999 | Glumac et al. | |
| 2002/0029955 A1 | 3/2002 | Sahle-Demessie et al. | |
| 2007/0166222 A1* | 7/2007 | Sorensen | ................ C01B 33/16 423/447.3 |
| 2010/0307593 A1 | 12/2010 | Thimsen et al. | |

FOREIGN PATENT DOCUMENTS

WO 2008049954 A1 5/2008

OTHER PUBLICATIONS

International Search Report for International Application No. PCT/US2017/057308, dated Feb. 14, 2018, 2 pages.
Written Opinion of the International Search Authority for International Application No. PCT/US2017/057308, dated Feb. 14, 2018, 3 pages.
Chakrabarty, R. K., Moosmuller, H., Garro, M. A., and Stipe, C. B. (2012).Observation of Superaggregates from a Reversed Gravity Low-Sooting Flame. Aerosol Sci. Technol., 46:i-iii.
Chakrabarty, R. K., Novosselov, I. V., Beres, N. D., Moosmuller, H., Sorensen, C. M., and Stipe, C. B. (2014). Trapping and Aerogelation of Nanoparticles in Negative Gravity Hydrocarbon Flames. Appl. Phys. Lett.,104:243103.
Zangmeister, C. D., Radney, J. G., Dockerya, L.T. , Young, J. T., Ma, X., You, R., Zachariah, M. R. (2014). Packing density of rigid aggregates is independent of scale. PNAS. 111(25):9037-9041.

* cited by examiner

*Primary Examiner* — Steven J Bos
(74) *Attorney, Agent, or Firm* — Armstrong Teasdale LLP

(57) ABSTRACT

A process for gas-phase synthesis of titanium dioxide aerosol gels with controlled monomer size and crystalline phase using a diffusion flame aerosol reactor operated in a buoyancy-opposed configuration is disclosed. The process includes introducing a precursor stream into a diffusion flame aerosol reactor, introducing a fuel stream into the reactor, combusting the precursor stream and the fuel stream in a flame to form at least one nanoparticle, and operating the reactor in a down-fired buoyancy-opposed configuration to produce the aerosol gel.

5 Claims, 26 Drawing Sheets

SYNTHESIS OF AEROSOL GELS COMPRISING MACRO-AGGREGATES IN A BUOYANCY-OPPOSED FLAME REACTOR BY A DIFFUSION-LIMITING CLUSTER AGGREGATING PROCESS

CROSS-REFERENCE TO RELATED APPLICATIONS

This application is a U.S. National Phase Application of PCT/US2017/057308, filed Oct. 19, 2017, which claims the benefit of priority to U.S. Provisional Patent Application Ser. No. 62/410,012, Oct. 19, 2016, the contents of which are hereby expressly incorporated by reference in their entirety.

STATEMENT REGARDING FEDERALLY SPONSORED RESEARCH & DEVELOPMENT

This invention was made with government support under grants CBET1511964 and AGS1455215, awarded by the National Science Foundation. The government has certain rights in the invention.

BACKGROUND OF THE DISCLOSURE

The present disclosure is generally directed to the synthesis of aerosol gels in a buoyancy-opposed flame reactor. The present disclosure is also directed to methods of using the flame reactor to produce nanoparticle aggregates having variable packing densities.

Aerosol gels exhibit unique material properties such as ultralow density and high surface area that give rise to their potential in various environmental applications such as catalysis, water and air purification, and photovoltaic applications. Synthesis of aerosol gels in gas phase has been recently demonstrated as a viable and economical alternative to the conventional wet sol-gel process, which is both time-consuming and expensive. The fundamentals of aerosol gelation theory have been thoroughly investigated in the last two decades. On the experimental front, novel techniques have been demonstrated for lab-scale synthesis of various aerosol gel materials. It is desired to establish gas phase synthesis as a scalable synthesis route for production of aerosol gels with controlled properties. In particular, control of monomer size in aerosol gels is needed because of its importance in governing the specific surface area (SSA), mobility, and optical properties of these materials.

In the present disclosure, the gas-phase synthesis of titanium dioxide (henceforth, $TiO_2$) aerosol gels with controlled monomer size and crystalline phase using a diffusion flame aerosol reactor operated in a buoyancy-opposed configuration is disclosed. The terms negative gravity (−g) and reverse gravity have been used in the recent past to describe this flame configuration. Flame aerosol reactors have been widely adopted by industries for cost-effective, continuous and one-step synthesis of a wide variety of nanomaterials. $TiO_2$, a material with versatility in practical applications ranging from white pigment to photocatalysts, has not yet been synthesized in a gel form via gas phase processes. At the same time, its well-investigated material properties as a function of process parameters make it an ideal reference material to demonstrate the control capabilities of the synthesis process of the present disclosure.

SUMMARY OF THE DISCLOSURE

In one embodiment of the present disclosure, a process for the synthesis of an aerosol gel is disclosed. The process comprises introducing a precursor stream into a diffusion flame aerosol reactor, introducing a fuel stream into the reactor, combusting the precursor stream and the fuel stream in a flame to form at least one nanoparticle, and operating the reactor in a down-fired buoyancy-opposed configuration to produce the aerosol gel.

In another embodiment of the present disclosure, an aerosol gel produced by a diffusion flame aerosol reactor is disclosed. The reactor includes a precursor stream, a fuel stream, and operates in a down-fired buoyancy-opposed configuration to produce the gel.

In another embodiment of the present disclosure, a process for synthesizing an aerosol gel comprising aggregates is disclosed. The process comprises diffusion-limiting cluster (or cluster-cluster) aggregating (DLCA) of at least one nanoparticle to produce an aggregate of nanoparticles, percolating the aggregate of nanoparticles to create a percolate of the aggregated nanoparticles, and DLCA of the percolate of aggregated nanoparticles to create an aerosol gel comprising aggregates.

In another embodiment of the present disclosure, a material comprising nanoparticle aggregates is disclosed. The material has a fractal morphology, wherein the material has a normalized length scale ($R_g/a$) of from about $1\times10^3$ to about $1\times10^5$.

DETAILED DESCRIPTION OF THE DISCLOSURE

Figure 1:
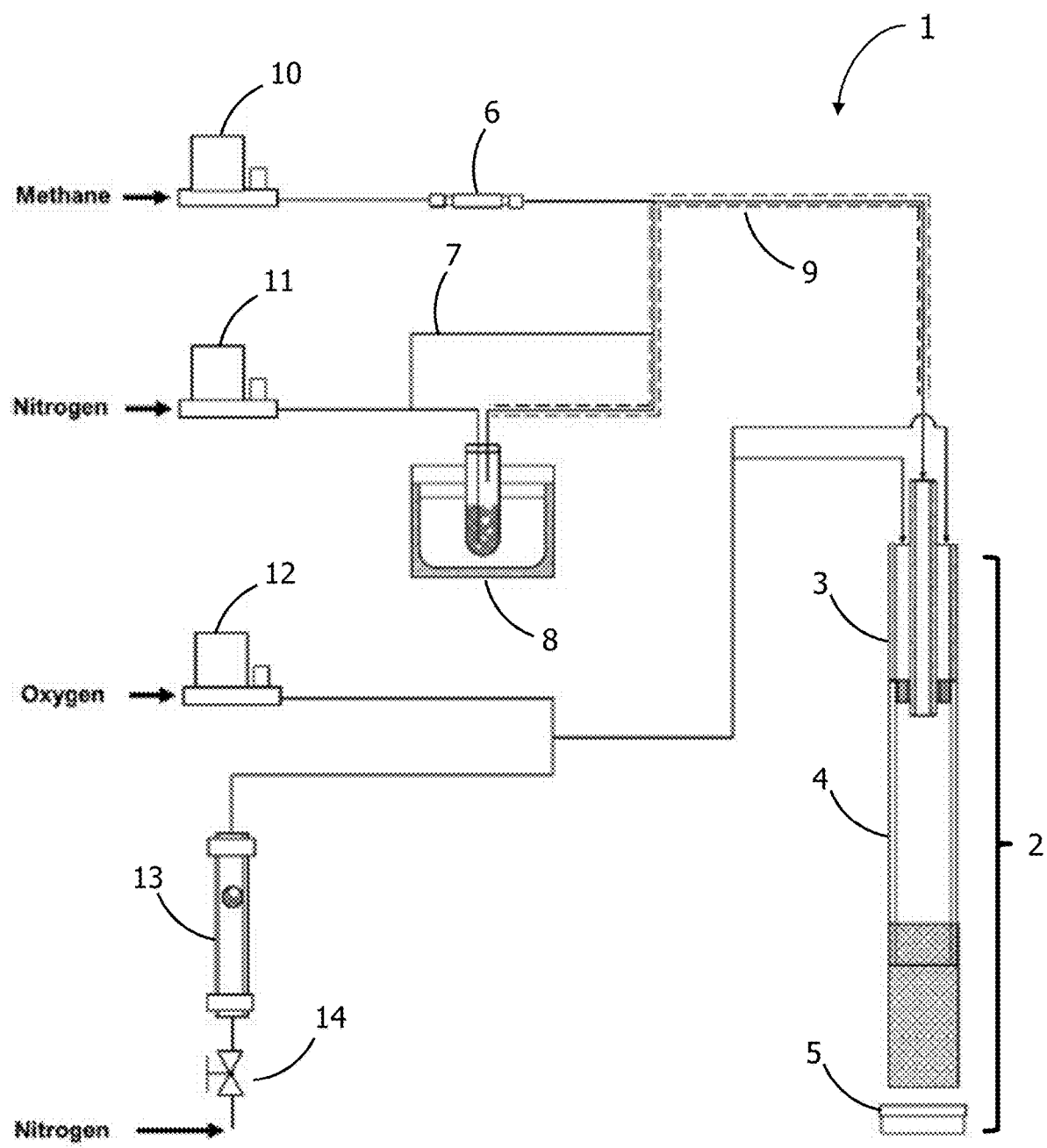
FIG. 1 depicts an exemplary embodiment of a schematic diagram of a flame aerosol reactor in accordance with the present disclosure.

Aerosol gels are a novel class of materials with potential to serve in various energy and environmental applications. In this disclosure, the synthesis of titanium dioxide ($TiO_2$) aerosol gels using a methane-oxygen co-flow diffusion flame reactor operated in down-fired configuration (fuel flow in the direction opposite to buoyancy forces) is demonstrated. Titanium tetraisopropoxide was fed as a precursor to the flame under different operating conditions. Control of the monomer size and crystalline phase of $TiO_2$ gel particles was achieved by adjusting the flame operating conditions, specifically the flame temperature, which was shown to significantly influence the phase transformation and rate of particle growth and sintering. The resulting materials were characterized for their physical and optical properties. Results showed that the $TiO_2$ aerosol gels had effective densities in the range 0.021-0.025 g/cm$^3$, which is 2 orders of magnitude less than the theoretical mass density of $TiO_2$. The monomer size distribution, crystalline phase, and UV-Vis absorbance spectra of the gels showed distinct characteristics as a function of flame temperature.

In some embodiments of the present disclosure, a process for the synthesis of an aerosol gel is disclosed. The process comprises introducing a precursor stream into a diffusion flame aerosol reactor, introducing a fuel stream into the reactor, combusting the precursor stream and the fuel stream in a flame to form at least one nanoparticle, and operating the reactor in a down-fired buoyancy-opposed configuration to produce an aerosol gel.

In an exemplary embodiment, the reactor comprises a metal precursor feed line for supplying a metal precursor stream from a source to a burner, a fuel feed line for supplying a fuel stream from a source to the burner and an oxidizer feed line for supplying an oxidizer stream from a source to the burner. Vaporized fuel and vaporized oxidizer are combusted in the burner to form a flame in the combustion zone. Metal species-based nanoparticles form in the combustion zone.

In some embodiments, the burner can comprise one or a plurality of metal precursor feed lines, fuel feed lines and/or oxidizer feed lines. In other embodiments, the fuel and oxidizer can be optionally admixed and introduced to the burner as an admixture through one or a plurality of feed lines. In other embodiments, the metal precursor and fuel can be optionally admixed and introduced to the burner as an admixture through one or a plurality of feed lines. In other embodiments, the metal precursor and oxidizer can be optionally admixed and introduced to the burner as an admixture through one or a plurality of feed lines. In other embodiments, the metal precursor, fuel and oxidizer can be optionally admixed and introduced to the burner as an admixture through one or a plurality of feed lines. In yet other embodiments, an inert gas can be added to the metal precursor stream as a carrier or dilution gas, to the fuel stream as a carrier or dilution gas, to the oxidizer stream as a carrier or dilution gas, and/or to the burner as a dilution gas. In still other embodiments, a flow control device, such as a control valve, can be place in the metal precursor feed line(s), fuel feed line(s) and/or oxidizer feed line(s) to regulate the flow of the metal precursor stream(s), the fuel stream(s) and/or oxidizer stream(s) to the burner.

In some embodiments, the precursor stream includes a metal precursor. The metal precursors include essentially any metal compound that can be volatilized and oxidized, nitrided, hydrolyzed, or otherwise reacted in a high temperature flame environment. Examples of volatile metal compounds non-exclusively include metal alkyls, metal olefin complexes, metal hydrides, metal halides, metal alkoxides, metal oxides, metal formates, acetates, oxalates, and esters generally, metal glycolates, metal glycolato alkoxides, complexes of metals with hydroxyalkyl amines, etc. Examples of typical metal precursors include titanium isopropoxide ("TTIP"), ferrocene and iron pentacarbonyl. All such compounds useful in the present process are termed "metal precursors." Volatile metal compounds are defined as solid or liquid compounds capable of passing into the vapor state at a temperature within the scope of the present invention. In some embodiments, the volatile metal compounds are heated and pass into a carrier gas stream for delivery to the burner. The carrier gas can be an inert gas, a fuel gas, an oxidizer gas or combinations thereof. Heat can be supplied to the volatile metal compounds indirectly such as by heating the container in which it is stored or by heating a recirculating slip stream, or directly such as by heating the carrier gas and passing it over or bubbling it through the volatile metal compound.

Preferred metals are those of the main groups 3 to 5 of the periodic table of the elements, the transition metals, and the "inner transition metals," i.e. lanthanides and actinides. "Metals" as used herein includes those commonly referred to as semi-metals, including but not limited to boron, germanium, silicon, arsenic, tellurium, etc. Metals of Groups 1 and 2 may also be used, generally in conjunction with a further metal from one of the aforementioned groups. Non-metal compounds such as those of phosphorous may also be used when a metal is used, e.g. to prepare mixed oxides or as dopants. In many cases, a predominant metal compound such as a tin or silicon compound is used, in conjunction with less than about 10 mole percent of another metal, such as a transition or inner-transition metal, to provide doped particles with unusual optical, magnetic, or electrical properties. Some preferred metals include silicon, titanium, zirconium, aluminum, gold, silver, platinum, and tin.

Metal species-based nanoparticles generated in the reactor from metal precursor compounds may be a zero valent metal, an oxide or hydroxide thereof, a carbide, boride, phosphide, nitride or other species, or mixture thereof. Preferred metal species are zero valent metals, metal oxides, or metal nitrides, more preferably zero valent metals and/or metal oxides. Representative metal compounds useful as photocatalysts of the present invention include anatase, rutile or amorphous metal oxides such as titanium dioxide ($TiO_2$), zinc oxide (ZnO), tungsten trioxide ($WO_3$), ruthenium dioxide ($RuO_2$), silicon oxide (SiO), silicon dioxide ($SiO_2$), iridium dioxide ($IrO_2$), tin dioxide ($SnO_2$), strontium titanate ($SrTiO_3$), barium titanate ($BaTiO_3$), tantalum oxide ($Ta_2O_5$), calcium titanate ($CaTiO_3$), iron (III) oxide ($Fe_2O_3$), molybdenum trioxide ($MoO_3$), niobium pentoxide ($NbO_5$), indium trioxide ($In_2O_3$), cadmium oxide (CdO), hafnium oxide ($HfO_2$), zirconium oxide ($ZrO_2$), manganese dioxide ($MnO_2$), copper oxide ($Cu_2O$), vanadium pentoxide ($V_2O_5$), chromium trioxide ($CrO_3$), yttrium trioxide ($YO_3$), silver oxide ($Ag_2O$), or $Ti_xZr_{1-x}O_2$ wherein x is between 0 and 1; metal sulfides such as cadmium sulfide (CdS), zinc sulfide (ZnS), indium sulfide ($In_2S_3$), copper sulfide ($Cu_2S$), tungsten disulfide ($WS_2$), bismuth trisulfide ($BiS_3$), or zinc cadmium disulfide ($ZnCdS_2$); metal chalcogenites such as zinc selenide (ZnSe), cadmium selenide (CdSe), indium selenide ($In_2Se_3$), tungsten selenide ($WSe_3$), or cadmium telluride (CdTe); metal nitrides such as silicon nitride (SiN, $Si_3N_4$) and gallium nitride (GaN); metal phosphides such as indium phosphide (InP); metal arsenides such as gallium arsenide (GaAs); semiconductors such as silicon (Si), silicon carbide (SiC), diamond, germanium (Ge), germanium dioxide ($GeO_2$) and germanium telluride (GeTe); photoactive homopolyanions such as $W_{10}O_{32}^{-4}$; photoactive heteropolyions such as $XM_{12}O_{40}^{-n}$ or $X_2M_{18}O_{62}^{-7}$ wherein X is Bi, Si, Ge, P or As, M is Mo or W, and n is an integer from 1 to 12; polymeric semiconductors such as polyacetylene; and mixtures thereof. Transition metal oxides such as titanium dioxide and zinc oxide are preferred because they are chemically stable, non-toxic, inexpensive, and exhibit high photocatalytic activity.

Thus, the aerosol gel produced comprises these materials, for example, in a preferred embodiment, $TiO_2$. In some embodiments, the aerosol gels have an uncrushed density of from about 0.010 g/cm$^3$ to about 0.030 g/cm$^3$, or about 0.021 g/cm$^3$, or about 0.025 g/cm$^3$. In some embodiments, the aerosol gels have a crushed density of from about 0.500 g/cm$^3$ to about 1.50 g/cm$^3$, or about 0.829 g/cm$^3$, or about 0.838 g/cm$^3$.

The fuel is any material which can be vaporized and oxidized under the flame conditions. Fuels include, without limitation, hydrogen; hydrocarbons such as methane, ethane, ethene, propane, propene, and acetylene; hydrocarbonoxy compounds such as lower alcohols, ketones, etc.; and sodium. Combinations of gases, particularly combinations of hydrogen and lower alkanes may be useful in many applications. Sodium is useful when films comprising non-oxidized metal species-based nanoparticles (e.g., zero valent metals) are required. A molar excess of fuel gas to metal precursor compound is preferred, for example a molar ratio range of about 100:1 to about 100,000:1, about 1000:1 to about 50,000:1 or even about 10,000:1 to about 20,000:1.

Typical oxidizers suitable for the practice of the present invention include, without limitation, air, ozone, oxygen, fluorine, sulfur, chlorine, bromine, and iodine. Oxygen is preferred when films comprising oxidized metal nanoparticles are required. In some embodiments, mixtures of gases can be used, for example, chlorine, fluorine, or ozone in combination with oxygen or air. In general, a stoichiometric excess of oxidizer to fuel is preferred with a ratio of about 1.1:1 to about 2:1 preferred.

In some embodiments, the morphology of the aerosol gels produced in accordance with the present disclosure can be controlled to produce a gel having a columnar morphology, a granular morphology, or combinations thereof. Columnar morphology is defined by two criteria; shape and crystallinity. The shape criterion is that of a column, i.e., continuous individual structures that are oriented roughly normal to the reactor. The columns are approximately normal to the reactor in that, for example, at least about 80% or at least about 90% of the structures have a central axis which is normal ±20 degrees. Those structures have an average width, w, and height, h, where the shape criterion is h>w. Columnar morphology is typically characterized by low surface area and superior electronic properties.

The crystalline criterion is based on grain size. Grain size is the characteristic dimension, or size, associated with a region of the same crystalline structure and orientation in space. Grain size can be measured by several methods known in the art, including x-ray diffraction (XRD) and transmission electron microscopy (TEM). The grain-size ($X_s$) criterion for the columnar morphology is w/10>$X_s$. The morphology is predominantly columnar when, for example, at least about 80% or at least about 90% of the deposited metal species-based nanoparticles constitute columns.

Granular morphology generally comprises metal species-based nanoparticles caked onto the reactor collector. Granular films are characterized by a high surface area and superior reactive properties.

The flame temperature may be adjusted by varying the fuel gas, by varying the ratio of fuel gas to oxidizer gas (i.e., flame stoichiometry), by introducing a non-reactive (i.e., inert gas) into one or more of the fuel gas, oxidizer gas or metal precursor streams, or by combinations thereof. For example, a hydrocarbon fuel gas typically produces a cooler flame than does hydrogen or sodium. In some embodiments, a hydrocarbon fuel gas can be admixed with hydrogen. The presence of non-reactive gases will act to reduce flame temperature. Flame temperature can vary from about 200° C. to about 5000° C., from about 300° C. to about 4000° C. or even from about from about 400° C. to about 3000° C. Depending on the identity of the metal species-based nanoparticle, the temperature can be, for example, about 500° C., 600° C., 700° C., 800° C., 900° C., 1000° C., 1100° C., 1200° C., 1300° C., 1400° C., 1500° C., 1600° C., 1700° C., 1800° C., 1900° C., 2000° C., 2100° C., 2200° C., 2300° C., 2400° C., 2500° C., 2600° C., 2700° C., 2800° C., 2900° C., 3000° C., 3100° C., 3200° C., 3300° C., 3400° C., 3500° C., 3600° C., 3700° C., 3800° C., 3900° C. or even 4000° C. or more. In some embodiments, the flame temperature is from about 550° C. to about 1300° C., or from about 590° C. to about 1250° C.

Gas-Phase Gelation Criteria

In gaseous phase, aerosol gelation starts out with individual nanoparticle monomers (spherules) colliding in the "cluster-dilute" regime via the diffusion-limited cluster agglomeration (DLCA) mechanism to form submicron-sized aggregates with a fractal dimension $D_f$~1.8. With time, if the scaling dimensionality of the growing DLCA collisional system becomes smaller than three, the condition for "cluster dense" agglomeration sets in. The available free volume inside the system then begins to get progressively occupied by DLCA aggregates to the point where the cluster volume fraction $f_{cluster}$, defined as the ratio of average aggregate separation to the average aggregate size, starts to approach unity. When $f_{cluster}$ reaches unity, DLCA aggregates form network-spanning superaggregates and eventually, gels with a characteristic $D_f$~2.5. The non-coalescing behavior of the aggregating monomers is an important prerequisite for gelation to take place in the gas phase. In order to reach the conditions for gelation, the particle residence time $t_{res}$ should be greater than the threshold gelation time $t_{gel}$:

$$T_{res} > t_{gel} = (4/3)\Pi K^1 a^3 f_v^{-2.5} \quad \text{(Equation 1)}$$

where K is the aggregation kernel, a is the radius of primary particle constituting a cluster, and $f_v$ is the volume fraction of monomers in the system. The possible roadblock involved in controlling monomer size in gas-phase systems hence arises from the third order dependency of $t_{gel}$ on the monomer size radius, as revealed by Equation 1. A small increase in the monomer size would substantially increase $t_{gel}$, which would need to be facilitated by the gas-phase reactors. Typical particle t in these reactors is in the order of a few hundred milliseconds, and increasing it to reach gelling conditions would require doing major structural modifications to the reactor design (e.g., increasing the reactor length). One way to overcome this difficulty is by operating a flame aerosol reactor in down-fired buoyancy-opposed configuration. The different operating conditions of this reactor and their influence on gel properties are described in detail herein.

Experimental and Characterization Methods

FIG. 1 depicts an exemplary embodiment of a schematic diagram of the flame reactor setup 1 in accordance with the present disclosure. The setup 1 includes a flame aerosol reactor 2, which includes a burner 3, a combustion chamber 4, and a collector 5. The setup 1 also includes supply units 10, 11, and 12. The supply units 10, 11, 12 provide, for example, methane, nitrogen, and/or oxygen gas to flow into the reactor 2. Supply unit 10 provides a gas that travels through a flashback arrestor 6 prior to entering the reactor 2. In the exemplary embodiment, supply unit 11 provides a gas that can enter into a bubbler 8 (such as, for example, a TTIP bubbler) or travel along a bypass channel 7—as opposed to entering the bubbler 8—en route to the reactor 2.

In some embodiments, a heating tape 9 is used to heat the pathway to the reactor 2. The setup 1 can further include a rotameter 13 and a valve 14 that controls the flow of a gas, such as nitrogen, through the rotameter 13.

In some embodiments, a Burke-Schumann type co-flow diffusion flame burner 3 was operated in down-fired configuration. The burner 3 consists of two concentric stainless steel tubes with 16 and 70 mm inner diameters, respectively. A honeycomb flow straightener (not pictured) was attached to the outer concentric tube to straighten the co-flow stream.

A quartz tube with 70 mm inner diameter and 402 mm length, used for housing the flame, was attached to the burner 3. Methane ($CH_4$) served as the combustible hydrocarbon fuel in this work, and was delivered through the inner concentric tube (burner head) at a constant volumetric flow rate of 1.0 L/min. Oxygen ($O_2$) served as the oxidizer and was delivered through the outer concentric tube at a volumetric flow rate of 10.0 L/min. Nitrogen ($N_2$) dilution, with flow rate varying from 0 to 30 L/min, was applied to the $O_2$ stream prior to entering the burner 3 for the purpose of adjusting the flame temperature. Titanium tetraisopropoxide (TTIP), the precursor for $TiO_2$, was fed into the system from a bubbler 8 via $N_2$ carrier gas. The flow rate of $N_2$ carrier stream was maintained at 1.0 L/min. The temperature of the water bath housing the TTIP was set at 80° C. to maintain the precursor feed rate at a steady 0.334 mmol/min. A heating tape 9 maintained at 250° C. was wrapped around the TTIP delivery line to prevent the condensation of TTIP vapor onto the line surface. A bypass line 7 without the TTIP feed was also installed to facilitate study of the TTIP-free hydrocarbon flame system. The flow rate of $CH_4$, $O_2$, and $N_2$-TTIP were controlled with mass flow controllers (Airgas Inc., PA, USA). The $N_2$ dilution flow was controlled using the combination of valve 14 (e.g., a needle valve) and rotameter 13. The flow rates of all species mentioned above were controlled and measured at standard temperature and pressure conditions (25° C. and 1 atm). A stainless steel collection unit 5 was fabricated and placed underneath the flame outflow region to collect the falling aerosol gel particles.

Prior to synthesizing $TiO_2$ aerosol gel, specific emphasis was placed to understand the influence of $N_2$ dilution on flame temperature condition. The precursor bubbler 8 was bypassed in this part of the experiment. Seven operating conditions, outlined in Table 1, were identified with volumetric flow rates of $N_2$ ranging between 0 and 30.0 L/min in 5 L/min increments.

Photographs of the flame body corresponding to these operating conditions were taken in a dark room. Flame temperatures were measured using a K-type thermocouple with bead diameter D=0.80 mm. The measurements were carried out at two specific locations: (i) the flame center, and (ii) the flame annular region. In the case of (i), the thermocouple bead was placed at the position along the axis of the cylindrical flame body at a distance of half the flame length from the burner head. In the case of (ii), the thermocouple bead was placed at the radially outermost position near the flame bottom. The measurement of temperature in the flame annular region holds valid under the assumption that the axial component of temperature gradient is negligible compared to its radial counterpart. The $TiO_2$ aerosol gel synthesis at two extreme operating conditions, I and VII (Table 1), was performed. Effective density of the gel sample before and after mechanical crushing with mortar and pestle was evaluated by measuring the weight of sample loaded in a container of known volume. Elemental composition of the samples in the product material was identified using energy dispersive X-ray spectroscopy (EDX, SEM FEI Nova 230). Purity of the material was evaluated based on weight percent of elemental Ti and O.

The morphology of $TiO_2$ aerosol gel was investigated with scanning electronic microscope (SEM FEI Nova 230). Specific surface area (SSA) and equivalent monomer diameter ($D_p$,BET) of $TiO_2$ aerosol gels were determined using the Brunauer-Emmett-Teller (BET) methodology with $N_2$ as an adsorbate. The crystalline phase of $TiO_2$ was examined with a Bruker d8 X-ray diffractometer with diffraction angle ranging from 2.5° C. to 30° C. TiO$_2$ aerosol gel absorbance spectrum in the ultraviolet (UV) and visible range was determined using a Perkin Elmer UV-Vis spectrometer. Absolute ethyl alcohol was used to disperse the samples. Sample suspension was loaded in a quartz micro cuvette with a 10 mm transmitted path line. Transmittance was measured using an integrating sphere. Absorbance was subsequently evaluated from the transmittance measurements.

Table 1 discloses the different flame operating conditions achieved by varying the amount of N$_2$ dilution in the co-flow stream. Q represents the volumetric flow rate of each species in liters per minute (L/min).

TABLE I

| Conditions | $Q_{CH4}$ (L/min) | $Q_{O2}$ (L/min) | $Q_{N2, D}$ (Dilution) (L/min) | $Q_{coflow}$ (L/min) | $Q_{N2, C}$ (TTIP carrier) (L/min) |
|---|---|---|---|---|---|
| I | 1 | 10 | 0 | 10 | 1 |
| II | 1 | 10 | 5 | 15 | 1 |
| III | 1 | 10 | 10 | 20 | 1 |
| IV | 1 | 10 | 15 | 25 | 1 |
| V | 1 | 10 | 20 | 30 | 1 |
| VI | 1 | 10 | 25 | 35 | 1 |
| VII | 1 | 10 | 30 | 40 | 1 |

Mechanism of In-Flame Vortex Formation and Particle Trapping

Figure 2:
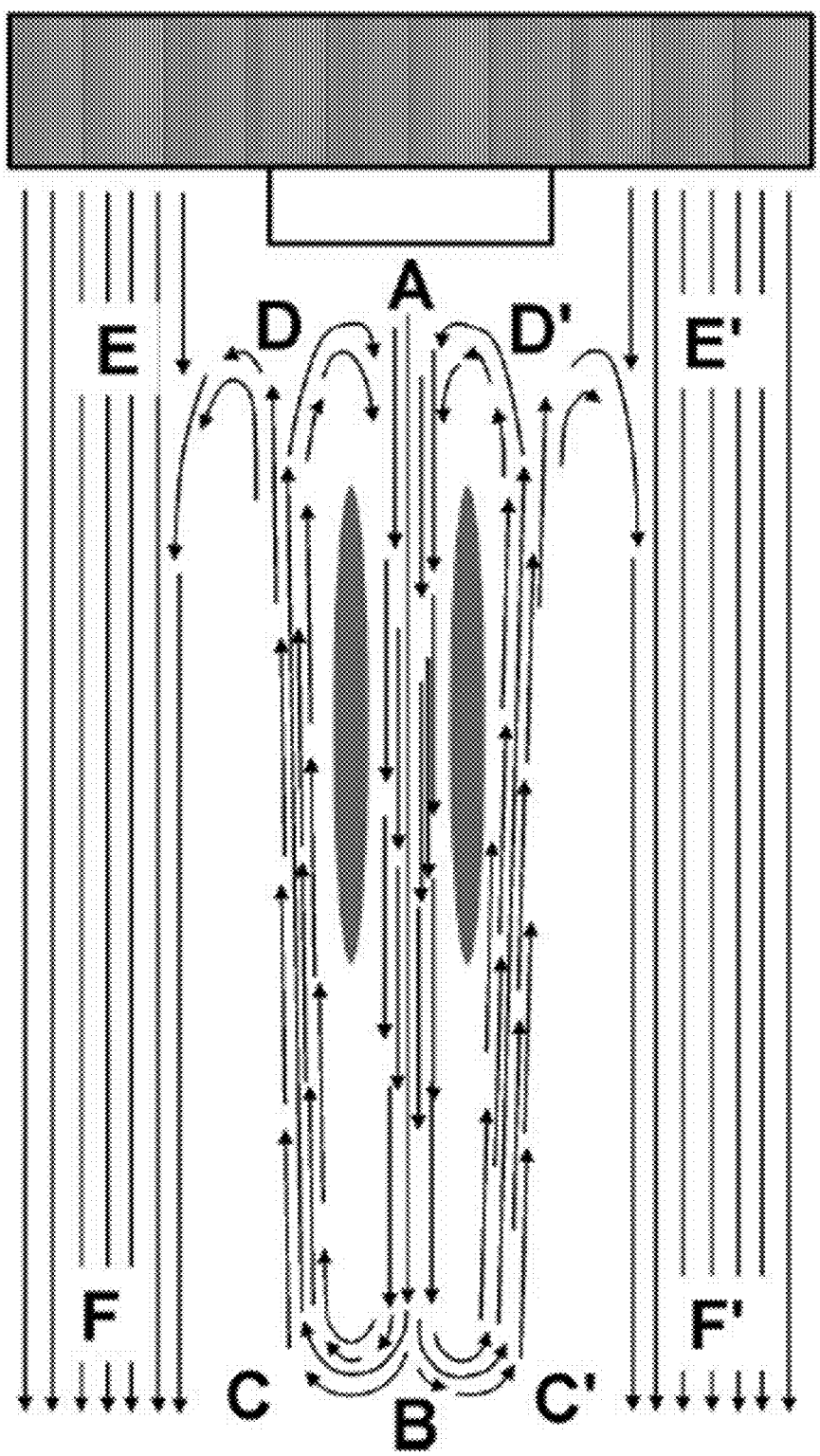
FIG. 2 depicts an exemplary embodiment of an illustrative sketch depicting the formation mechanism of in-flame recirculation and vortices in accordance with the present disclosure.

The opposing effect of buoyancy-induced upwelling convection and downward flame gas momentum exists in a down-fired diffusion flame. As a result, a flicker free, cylindrical flame body with a U-shaped bottom is formed. FIG. 2 shows an illustrative sketch explaining the formation mechanism of this distinct flame structure. Arrows from A to B represent the downward flow of the flame gas, starting from the burner head to the stagnancy point located at the flame end. This flow continuously decelerates along the axial direction. At the flame end, the axial component of the gas velocity reaches zero. The buoyancy-induced convection is marked by arrows B to D (D') in the flame body. This upwelling convection eventually merges into the incoming fuel and co-flow streams, depicted by arrows as from D(D') to A and flow from D(D') to E(E'), respectively. Flow from E(E') to F(F') represents oxidizer co-flow. Kelvin-Helmholtz instability sets up between the opposing flow fields of fuel/air and upwelling convective gases, which triggers a series of static vortices throughout the flame body (represented by the shaded area in FIG. 2). Aerosols are trapped in these vortices, which leads to considerable enhancement in their in-flame residence time. The exit of these particles from the vortices and eventually the flame body relies on their diffusion across the flame boundary and their gravitational settlement due to their increased size and mass.

Flame Characterization

Figure 3:
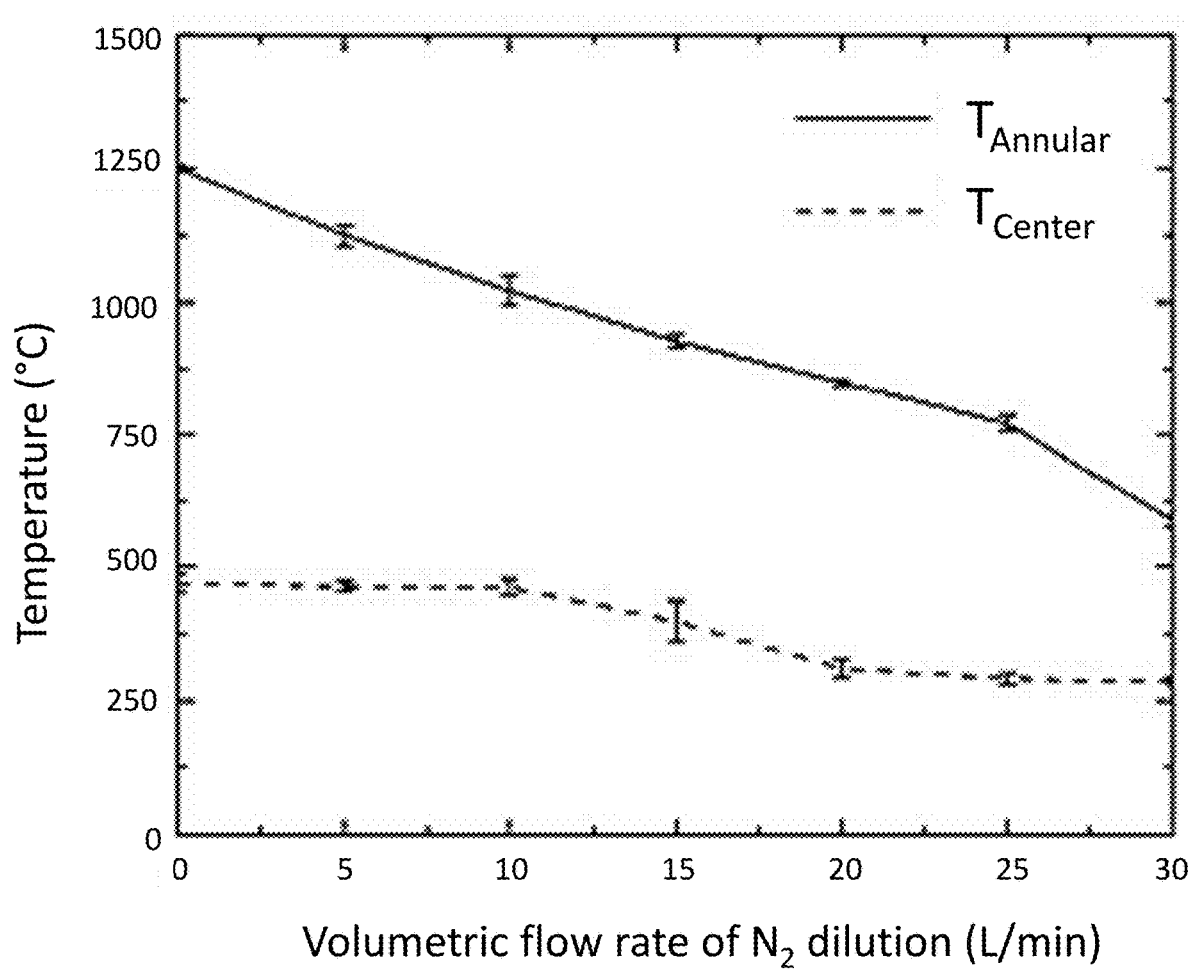
FIG. 3 depicts an exemplary embodiment of temperature measurement at the flame center and annular region of a flame reactor in accordance with the present disclosure.
Figure 4:
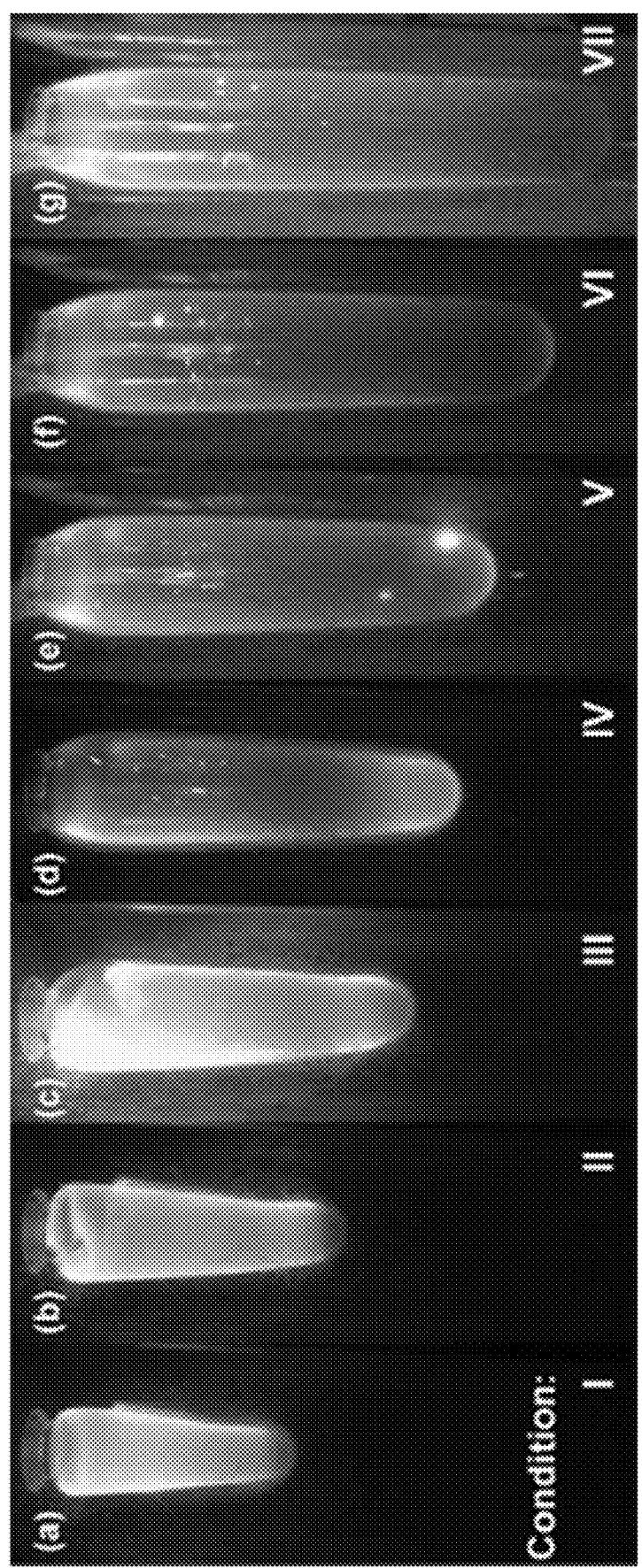
FIGS. 4A-4G depict exemplary embodiments of photographs of a flame operated at different conditions in accordance with the present disclosure.
Figure 5:
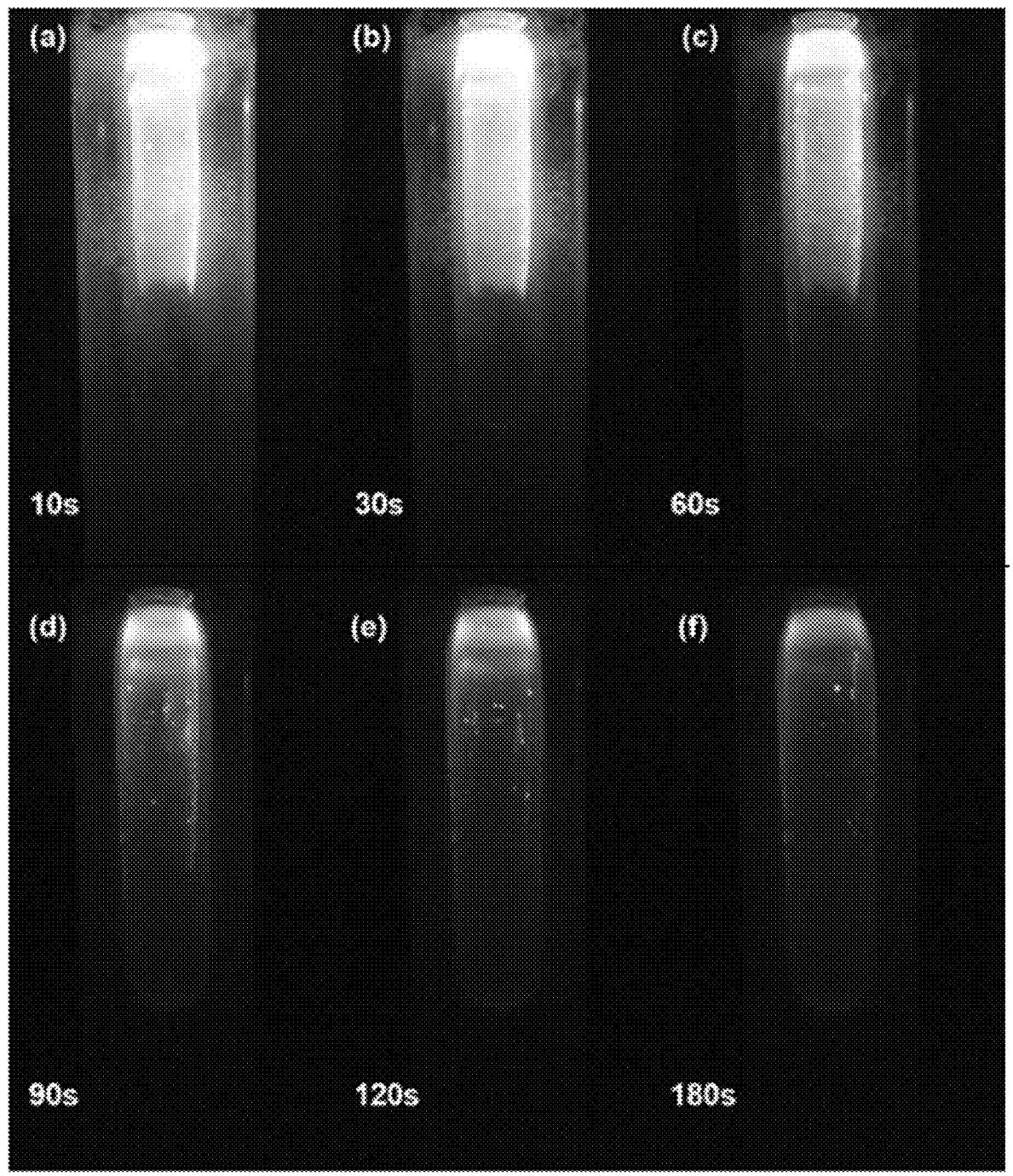
FIGS. 5A-5F depict exemplary embodiments of photographs of a flame body taken at different times in accordance with the present disclosure.

As in conventional diffusion flames, control of temperature in a down-fired buoyancy-opposed diffusion flame is achieved in some embodiments by addition of inert gases to the co-flow gas stream. A decrease in temperature from 1250° C. to 590° C. at the flame annular region was observed upon incremental addition (0-30 L/min) of N$_2$ dilution to the co-flow gas stream (FIG. 3). With the increase in flow rate of N$_2$, the total specific heat of the system is increased, hence resulting in a decrease in adiabatic flame temperature. The increased amount of N$_2$ in the system also absorbs sensible heat from combustion, further lowering the temperature of the system. The temperature of the flame center was always lower compared to the annular regions. The temperature of the flame's annular region is an important control parameter for particle synthesis. Although gelation of aggregates take place throughout the flame body, the gel particles have been observed to reside the maximum duration in the flame's annular region.

FIGS. 4A-4G show the increase in flame lengths and subsequent change in flame color with N$_2$ dilution ranging between 0 and 30 L/min in 5 L/min increment (from condition I to VII outlined in Table 1). The drop in flame temperature is qualitatively seen as the bluing of the flame body from the snapshot images in the figures (yellow to blue from FIG. 4A to 4G). A lower temperature decreased the rate of CH$_4$ decomposition and suppressed soot formation, resulting in the blue color of the soot-free flame. It is to be noted that changing of the flame color from yellow to blue does not happen instantaneously with switching of the flame operating conditions. As shown via the sequence of photographs in FIGS. 5A-5F (yellow to blue from FIG. 5A to 5F), there was a latency period of approximately 3 min between the color changes, which is attributed to the residual soot particles trapped in the flame vortices continuing to give off yellow incandescence. This latency period is qualitatively translated as the maximum residence time of the gel particles before they gravitationally settle out.

TiO$_7$ Gel Synthesis and Characterization

Figure 6:
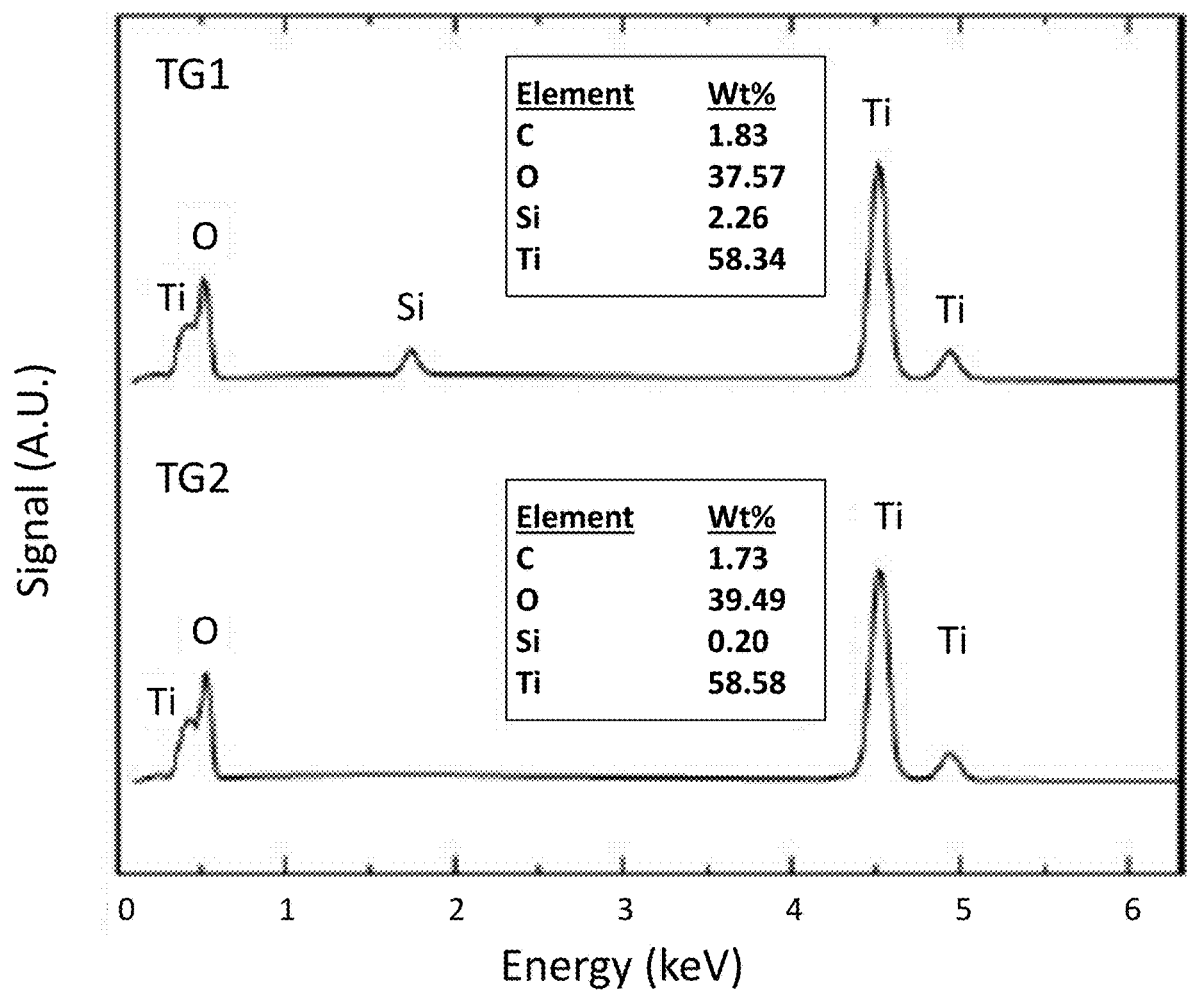
FIG. 6 depicts an exemplary embodiment of EDX spectra of aerosol gels in accordance with the present disclosure.

Continuous aerosol gelation of TiO$_2$ nanoparticles was visually observable in the flame body upon addition of TTIP precursor to the system. Physical size of the individual gel particles reached sub-millimeter in size before gravitationally settling out. The TiO$_2$ gel particles produced in high temperature condition I and low temperature condition VII (Table 1) are denoted as TiO$_2$ aerosol gel type 1 (TG1) and type 2 (TG2), respectively. FIG. 6 depicts EDX spectra with element weight percentage of TiO$_2$ aerosol gels synthesized at 1250° C. (TG1) and 590° C. (TG2). As shown in FIG. 6, Ti and O atoms were the primary compositional elements detected in the EDX spectra of the gel particles. In the case of TG1, presence of silicon was observed due to the interference of the silicon wafer substrate on which the gel particles were sampled. The weight percent of elemental carbon in TG1 and TG2 were 1.83 and 1.73, respectively, suggesting that the gel particles were generally free from carbon contamination. For synthesizing TG1, the flame was operated with pure O$_2$ in the co-flow stream, which facilitated rapid and complete oxidation of any solid carbonaceous products. In the case of TG2, the flame was operated below sooting limit, thereby inhibiting formation of any solid carbon products.

The effective densities of uncrushed TG1 and TG2 particles were measured to be 0.025 and 0.021 g/cm$^3$, respectively. In comparison to TG2, the TG1 sample demonstrated greater rigidity and mechanical strength by resisting structural fragmentation upon mechanical crushing with bare hands. The effective densities of the crushed samples were 0.829 and 0.838 g/cm$^3$, respectively. The large difference between the effective densities and the theoretical TiO$_2$ material density (4.23 g/cm$^3$) is evidence of the "fluffiness" or large fraction of air voids inside the aerosol gel materials. The effective densities of the TiO$_2$ gel particles disclosed herein are approximately four to five times greater than that of the carbon gel particles synthesized in previous studies using the same reactor. Aside from the fact that the mass density of TiO$_2$ is greater than that of carbon, the high degree of sintering between the TiO$_2$ monomers contributed to their higher effective density. Sintering and necking of monomers significantly reduced the volume fraction of voids in the gel materials.

Figure 7:
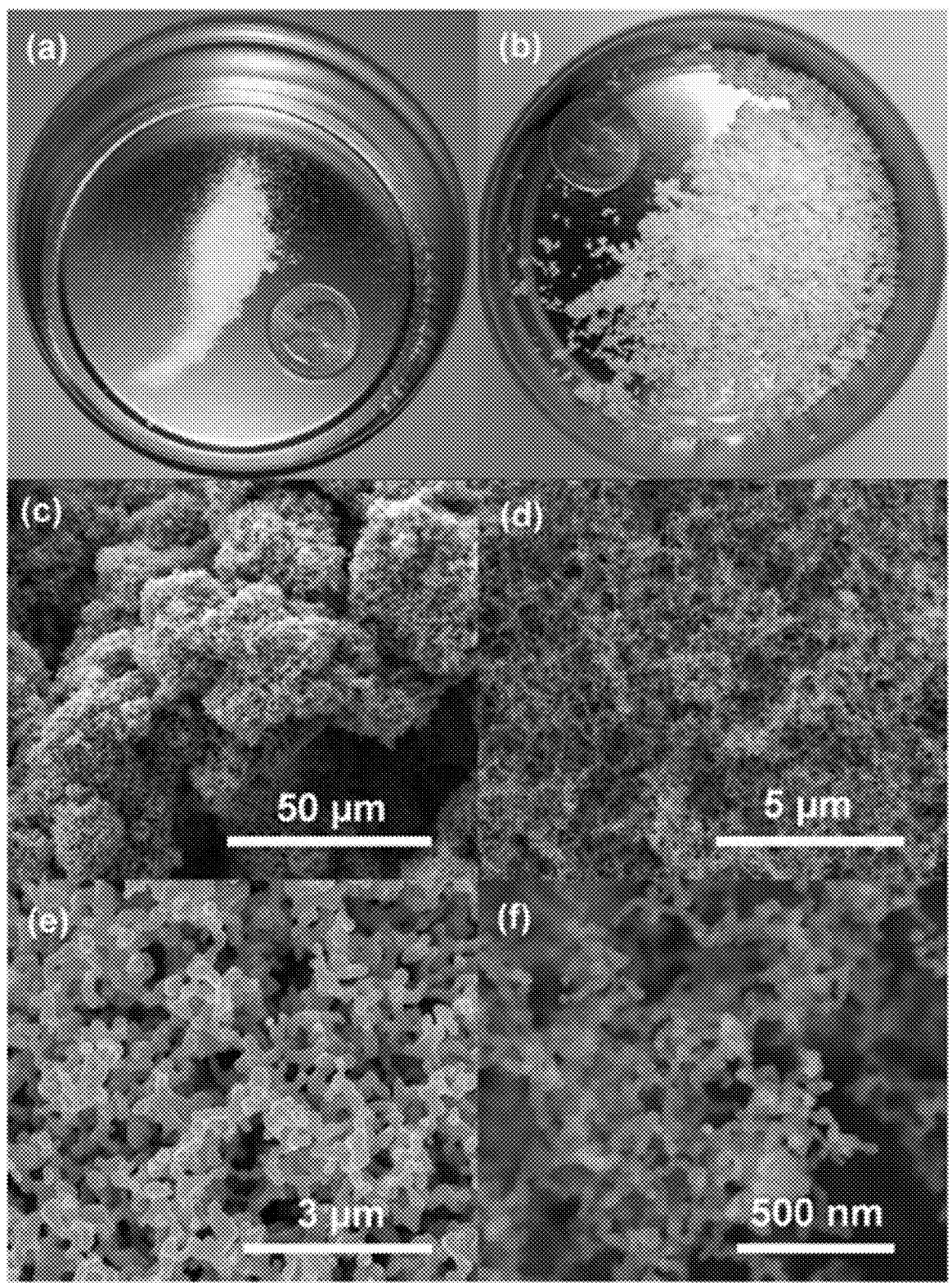
FIGS. 7A and 7B depict exemplary embodiments of optical photographs of aerosol gels in accordance with the present disclosure.
FIGS. 7C-7F depict exemplary embodiments of SEM images of aerosol gels in accordance with the present disclosure.

FIGS. 7A, 7C, and 7E (for TG1) and FIGS. 7B, 7D, and 7F (for TG2) show the $TiO_2$ gel morphologies at different magnifications. Optical photographs (FIGS. 7A and 7B) show that bulk aerosol gels were white in color and sub-millimeter in average size. SEM images (FIGS. 7C-7F) show the highly porous nature of the material. In FIGS. 7C and 7D, the typical volume spanning, semigrid network-like structure of aerosol gels is shown. Upon zooming in, the crystalline nature of $TiO_2$ monomers and their degrees of sintering is shown. Interparticle necking interfered with the accurate determination of monomer size distribution from SEM images. Due to this, the average monomer sizes of different samples were also estimated using the BET technique.

Figure 8:
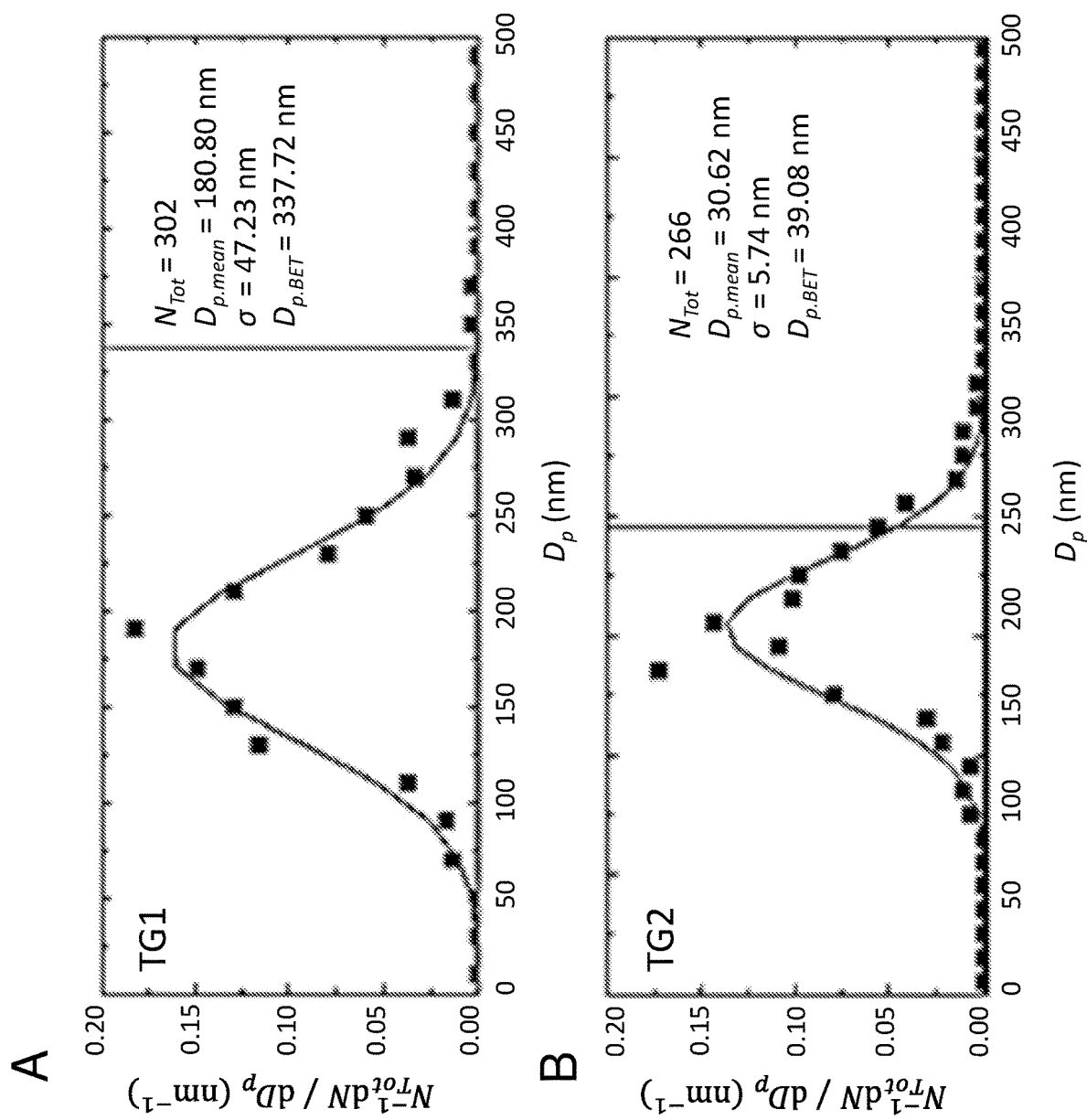
FIGS. 8A and 8B depict exemplary embodiments of monomer size distribution of aerosol gels in accordance with the present disclosure.
Figure 9:
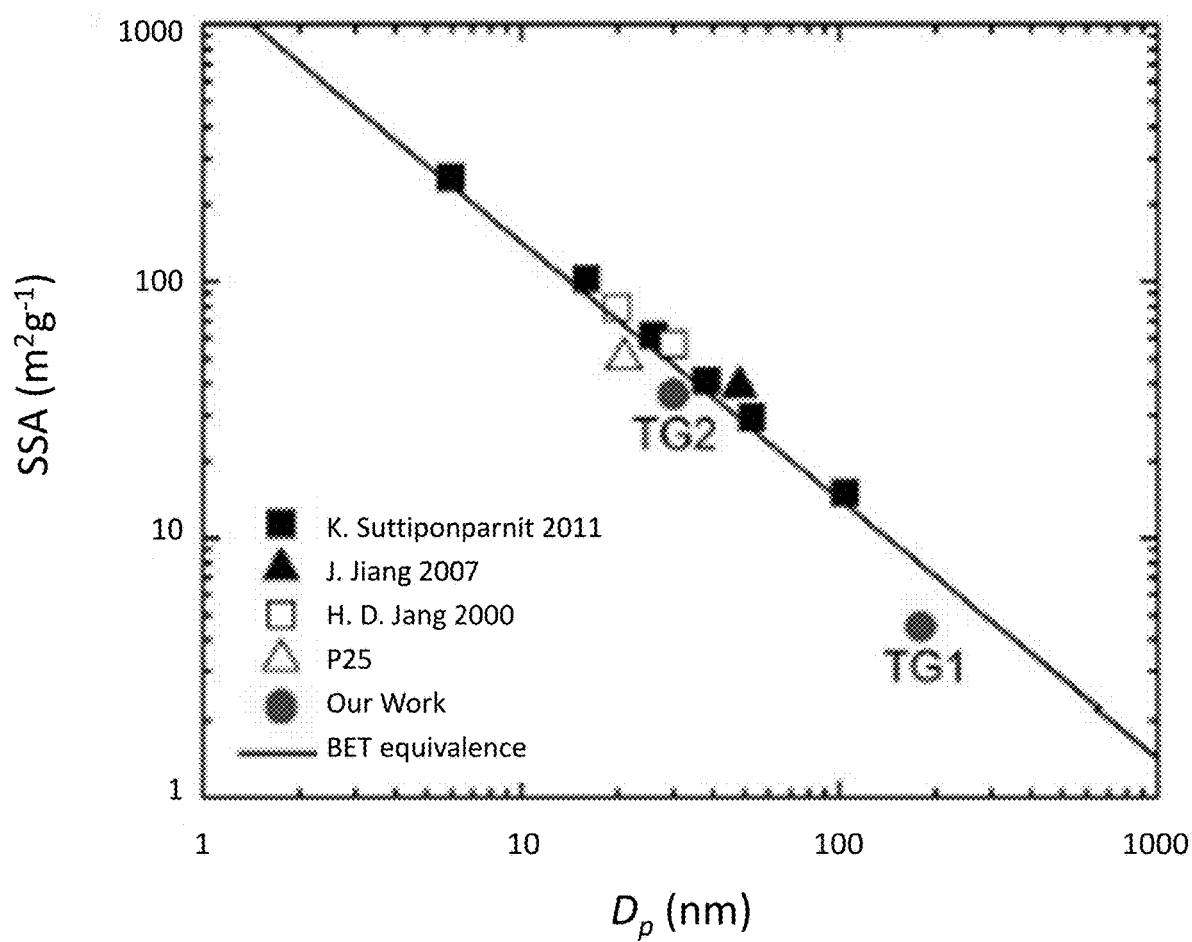
FIG. 9 depicts an exemplary embodiment of the specific surface area of aerosol gels as functions of monomer size in accordance with the present disclosure.

The results of the monomer number size distribution are shown in FIG. 8. The average monomer size of the TG1 sample was an order of magnitude greater than that of TG2. This is because of the increased particle growth and sintering rate in a higher temperature reaction system, such as that of TG1. The vertical solid lines represent the values determined using BET technique. FIG. 9 shows the SSA versus monomer diameter of TG1 and TG2 samples. The same figure shows comparison of the results with previous findings. The SSA values of aerosol gels disclosed herein were on the lower side owing to the larger monomer diameter and high degree of necking between the monomers. The BET equivalence monomer size was $D_{p,BET}=6/SSA_\rho$.

Figure 10:
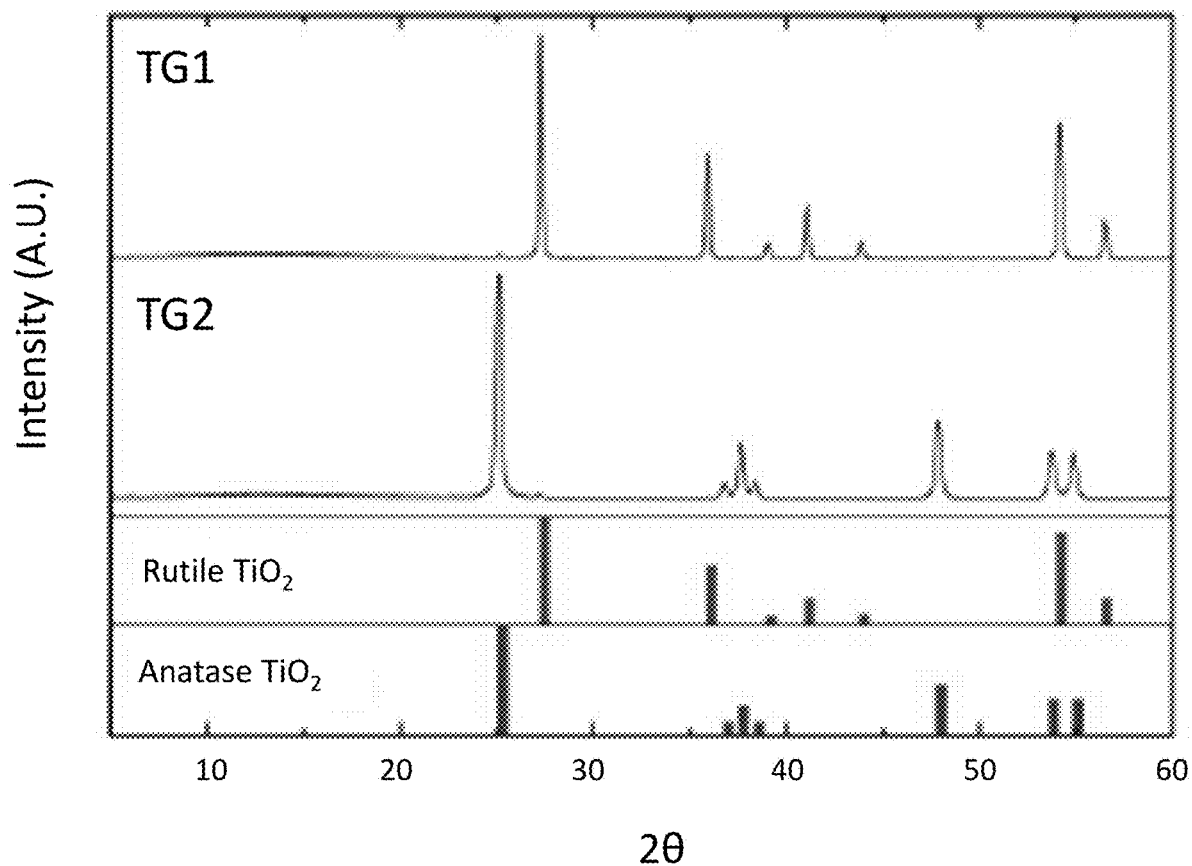
FIG. 10 depicts an exemplary embodiment of X-ray diffraction patterns of aerosol gels in accordance with the present disclosure.

FIG. 10 shows the X-ray diffraction patterns of exemplary $TiO_2$ gel samples in accordance with the present disclosure. Monocrystalline anatase and rutile phases of $TiO_2$ were identified in TG2 and TG1, respectively. Their distinct crystal phase shows up due to their synthesizing temperature conditions. Past studies showed that $TiO_2$ crystal formation always starts from anatase phase owing to its lower surface free energy. Anatase to rutile (ATR) phase transformation has been theorized to occur when temperature of the system is high enough to sustain the nonreversible rearrangement of the crystal lattice structure. Thus, the kinetics of ATR transformation are temperature dependent and have been shown to be slow for temperatures below 610° C. This threshold is very close to the operating temperature of the flame used for synthesizing TG2. Hence, pure anatase phase comprising the TG2 sample was observed. The higher temperature used for synthesizing TG1 led to its complete ATR transformation in its composition.

Figure 11:
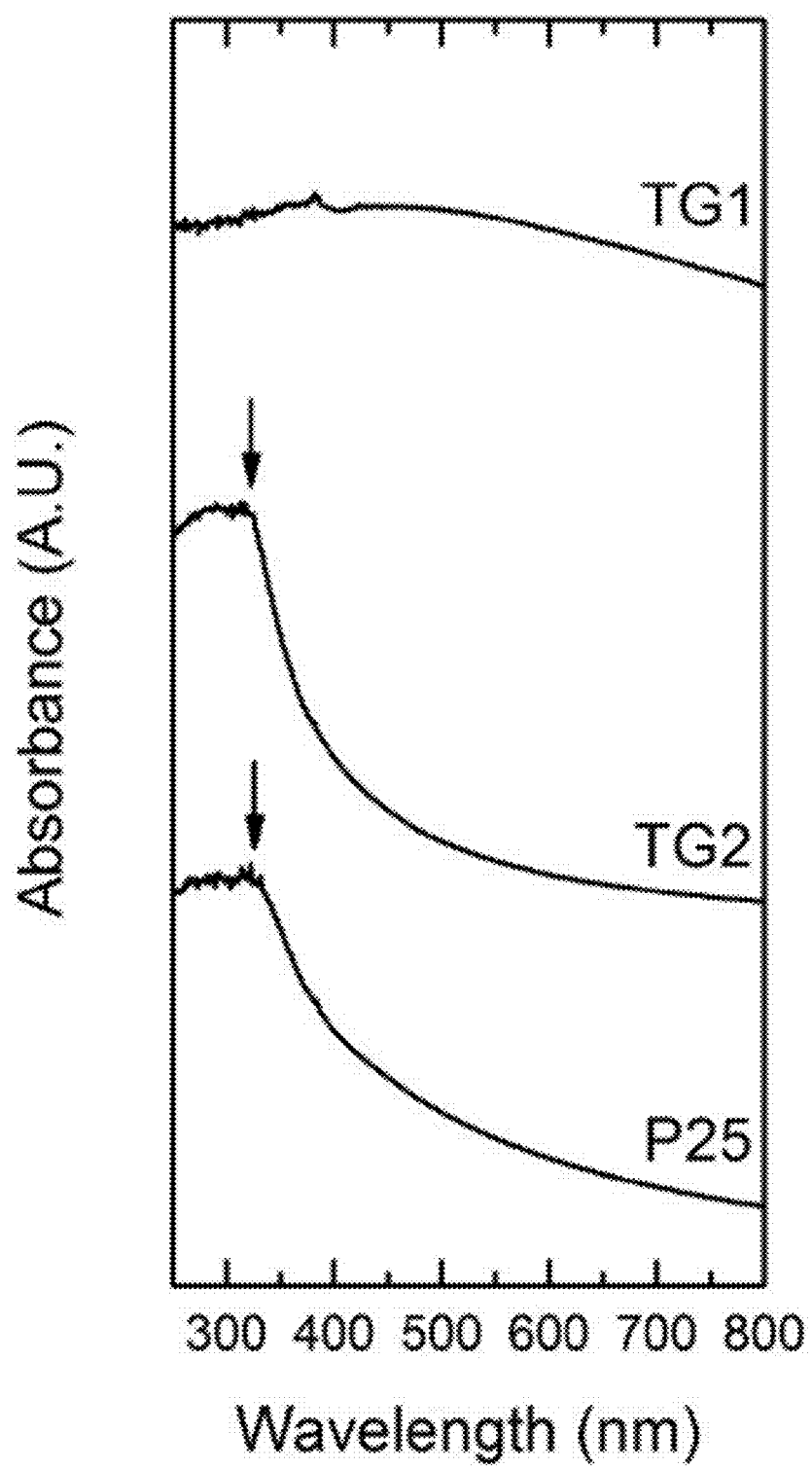
FIG. 11 depicts an exemplary embodiment of UV-Vis absorbance spectra of aerosol gels in accordance with the present disclosure.

FIG. 11 shows the UV-Vis absorbance spectra of TG1 and TG2 in comparison to that of the industry-standard P25 (Sigma-Aldrich, St. Louis, Mo., USA). The absorbance spectrum of TG2 demonstrates a similar pattern to P25 due to both materials' similar crystalline composition (anatase) and monomer size. The absorbance shoulder in both samples occurs around 325 nm of the incident light wavelength. Beyond this point, absorbance attenuates with increasing wavelength. This is in good agreement with the well-investigated optical properties of $TiO_2$. On the contrary, TG1 demonstrates a rather unconventional absorbance spectrum: a flat and slowly attenuating curve. One reason for this behavior is the band gap narrowing effect. With the introduction of vacancies in the rutile lattice structure by the higher synthesizing temperature of TG1, the defect energy levels are more easily introduced into the material's original band gap. As the band gap energy levels narrow, $TiO_2$ becomes more responsive to absorption of light in the visible spectrum. This behavior is also attributed to the enhancement in scattering by the larger monomers of the TG1 sample. When monomer size reaches as high as 300 nm, the scattering efficiency dominates over absorption irrespective of change in wavelengths in the UV-Vis spectrum.

In the present disclosure, the phenomenon of aerosol gelation in a down-fired, buoyancy-opposed diffusion flame systems was utilized to synthesize $TiO_2$ gels. The in-flame aerosol trapping effect was reproduced under varying flame operating conditions of $N_2$ dilution ranging between 0 and 30 L/min. The corresponding flame temperatures ranged between 1250° C. and 590° C. Control of the morphology and crystalline phase of $TiO_2$ aerosol gels was achieved by exploiting the dependency of monomer growth rate and crystal transformation on temperature. Doping of $TiO_2$ with soot particles was avoided by operating the flame in extreme temperature conditions.

The effective densities of $TiO_2$ aerosol gels synthesized in high (TG1) and low (TG2) temperature conditions were measured to be 0.025 and 0.021 $g/cm^3$, respectively, before mechanical crushing, and 0.829 and 0.838 $g/cm^3$, respectively, after crushing. The average monomer diameters of TG1 and TG2 samples were 181 and 31 nm, respectively, based on SEM images, and were 338 and 39 nm, respectively, based on measurements by the BET technique. The large difference in monomer size distribution was primarily attributed to the difference in particle growth rates at different operating temperature conditions. Monocrystallite rutile and anatase phases of $TiO_2$ were detected in TG1 and TG2, respectively, with high degree of purity. TG2 demonstrated typical UV-Vis absorbance spectrum associated with anatase $TiO_2$, while an overall flattened absorbance spectrum was seen in the case of TG1.

Scaling Laws for Packing Density of Nanoparticle Aggregates

The present disclosure is further directed to a novel technique for continuous production of variable packing density materials through a gas phase process. The materials (e.g., mesoporous materials) serve a variety of energy and engineering applications such as, but not limited to, catalysts, absorbents, and thermal and electrical insulators. The present disclosure is directed to a single-step continuous synthesis process of these materials using a flame reactor involving aerosol trapping effects. A two-stage co-flow diffusion burner is operated in a down-fired configuration and recirculation is triggered in the flame due to the opposing effect between the buoyancy force and flow. Application of various precursors facilitates the formation of nanoparticles, which are then trapped in the flame and their crossover to gelation (percolation) is reached in, for example, less than one minute.

In some embodiments, the bottom-up synthesizing route toward millimeter-sized bulk mesoporous materials consists of three successive stages. The first stage is DLCA of nanoparticles, occurring in the size range of from about 15 nm to about 100 nm, from about 20 nm to about 100 nm, or from about 30 nm to about 100 nm. The first stage leads to aggregates with a mass fractal dimension $D_f$ of about 1.80. The second stage is the percolation of the aggregates, which occurs in the size range of from about 100 nm to about 50 μm, from about 100 nm to about 40 μm, or from about 100 nm to about 30 μm. This stage leads to percolates having a $D_f$ of about 2.50. The third stage is aggregation of the percolates, which occurs in the size range of from about 30 μm to about 10 mm, from about 30 μm to about 7 mm, or from about 30 μm to about 5 mm. This stage leads to macro-aggregates having a $D_f$ of about 1.70.

This disclosure is also directed to a single-step and continuous synthesis of materials (e.g., mesoporous materials) with precise control of packing density ranging between about 10% to about 0.01%. The process is applicable for the synthesis of both carbonaceous and metal-oxided porous materials in gel form with controlled purity (e.g., >95%).

Fractal aggregates in nature grow with a scaling dimensionality less than the spatial dimension. This results in their packing density ($\theta_f$)—defined as actual volume occupied by solid subunits constituting an aggregate relative to total aggregate volume—decreasing with increasing size $R_g/a$ (aggregate radius of gyration normalized by average radius of monomers (repeating subunits)). Fundamental questions remain regarding the scaling laws and physical mechanisms controlling the evolution of $\theta_f$, especially after the onset of gelation. This is in part because of experimental challenges owing to the effects of gravity and thermal fluctuations on the formation and structural stability of aggregates in the large $R_g/a$ limit. The present disclosure mapped the scaling of $\theta_f$ for aggregates made of non-repulsive monomers—across five orders of magnitude of $R_g/a$. The experiments revealed three successive growth regimes, namely diffusion-limited cluster aggregation (DLCA) of monomers, percolation of aggregates, and DLCA of percolates, with distinct cross-over points occurring at $R_g/a \approx 4$ and $1 \times 10^3$. Corresponding to these regimes, $\theta_f$ decreased in distinct power-law exponents of −1.3, −0.5, and −1.3, respectively. These results, besides demonstrating the experimental realization of stable aggregation in very large $R_g/a$ limit, redefined the currently held scaling law for $\theta_f$ of rigid aggregates, and have implications for synthesis of materials with superlative properties and accurate estimation of climate forcing by carbonaceous aerosols.

Figure 12:
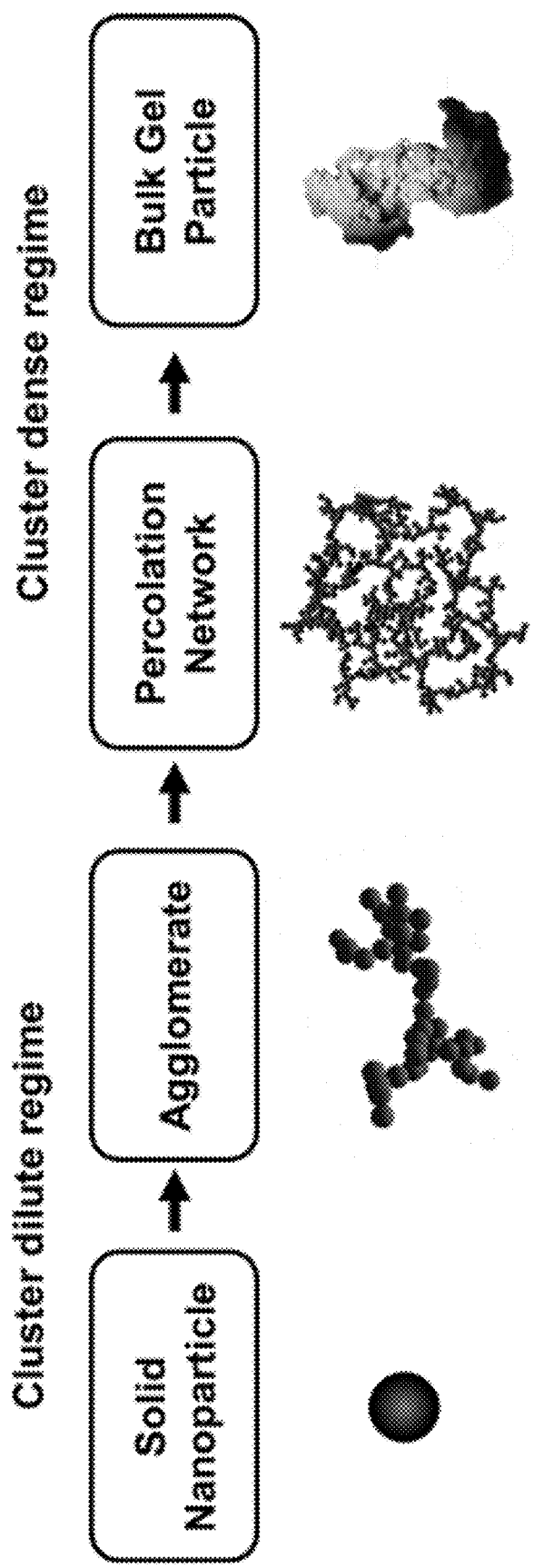
FIG. 12 depicts an exemplary embodiment of the structural evolution of aerosol gel particles in accordance with the present disclosure.

FIG. 12 is an exemplary embodiment of the structural evolution of a nanoparticle to a bulk gel particle in accordance with the present disclosure. As the evolution progresses, the solid nanoparticle (D=3) becomes part of an agglomerate ($D_f \sim 1.78$), which then becomes part of a percolation network ($D_f \sim 2.50$), which then progresses to a bulk gel particle.

Figure 13:
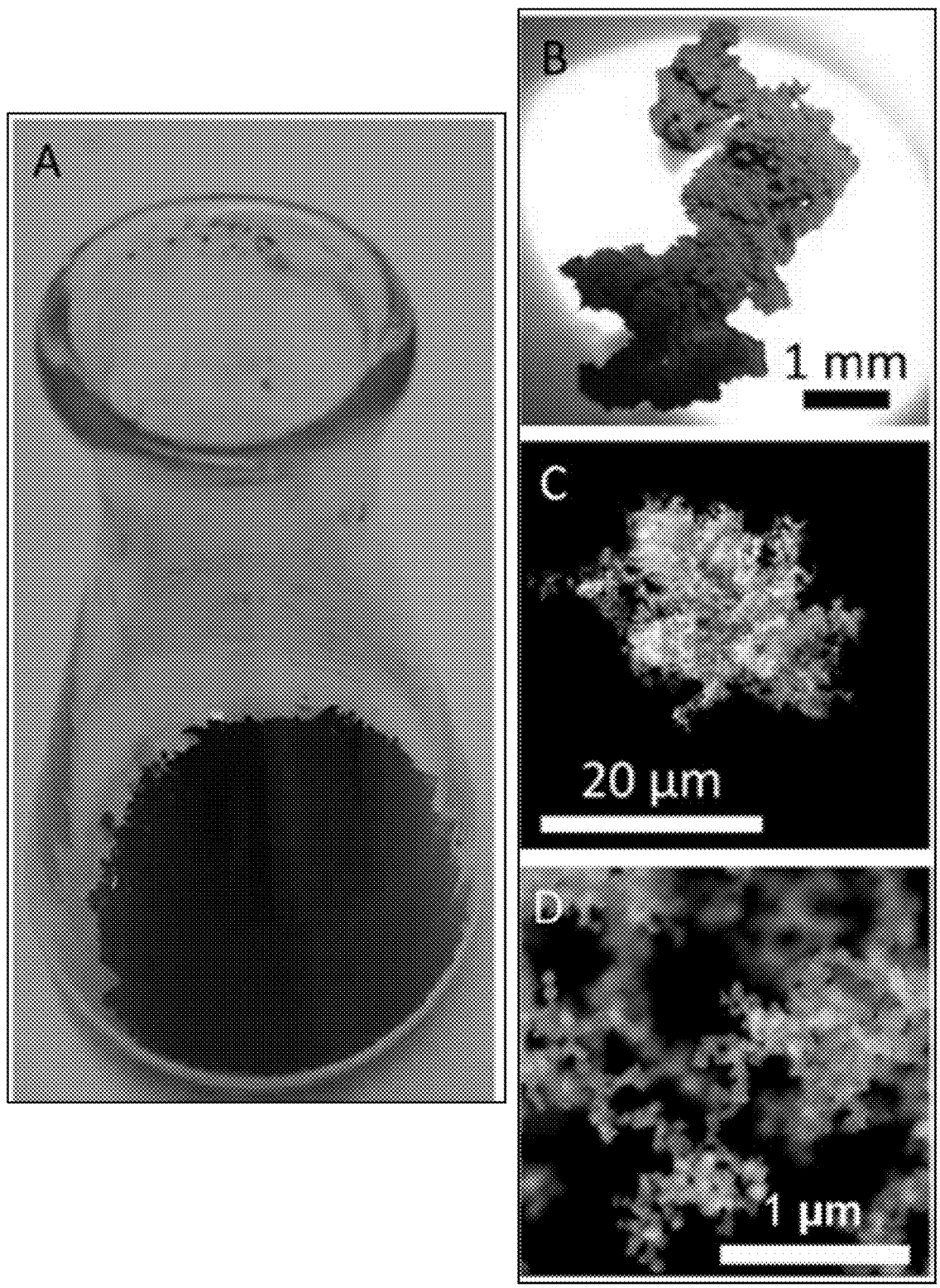
FIG. 13A depicts an exemplary embodiment of a photograph of an aerosol gel comprising bulk nanoparticles in accordance with the present disclosure.
FIG. 13B depicts an exemplary embodiment of a photograph of a single aerosol gel particle in accordance with the present disclosure.
FIGS. 13C and 13D depict exemplary embodiments of SEM images of aerosol gels in accordance with the present disclosure.

FIG. 13A depicts a photograph of a bulk nanoparticle aerosol gel. FIG. 13B depicts a photograph of a single aerosol gel particle. FIGS. 13C and 13D depict SEM images of aerosol gels at different degrees of magnification in accordance with the present disclosure.

Irreversible collision and aggregation of solid nanoparticles (NPs) leads to aggregates following fractal morphology. The structure remains self-similar over a finite length scale. This type of material is observed in a variety of natural and manmade scenarios ranging from a candle flame to wildfires; from vehicular exhaust to the products of various aerosol reactors.

The packing density ($\theta_f$) of aggregates is a fundamental property that influences their mechanical strength, optical absorptivity, and thermal and electrical conductivity. The scaling laws and physical mechanisms controlling the evolution of $\theta_f$, especially at large aggregate sizes, have been experimentally challenging to probe due to the effects of external forces such gravity on the structural stability of aggregates. The present disclosure describes that $\theta_f$ decreases through three successive aggregate growth regimes, namely diffusion-limited cluster aggregation, percolation, and aggregation of percolates, in distinct power-law exponents of −1.3, −0.5, and −1.3, respectively, across five decades of aggregate size. The results disclosed herein redefine the current consensus of $\theta_f$ reaching a constant 0.36 at large aggregate size-limit.

Irreversible aggregation of dispersed particles is a phenomenon ubiquitously observed in nature and engineering applications. When the repeating units (hereafter referred to as monomers) are rigid and non-coalescing, unique forms of aggregates are formed with a fractal morphology quantified using the well-established power-law relationship: $N = k_0 (R_g/a)^{D_f}$, where N is the total number of monomers in an aggregate, $R_g$ is the radius of gyration of the aggregate, a is the radius of monomer, $k_0$ is a scaling prefactor of order unity, and $D_f$ is the mass fractal dimension. The fractal morphology implies the internal structure of these aggregates to be porous; the actual volume occupied by the solid material in an aggregate ($V_s$) is always smaller than the total volume of the aggregate (V). The aggregate packing density ($\theta_f$), defined as the ratio of $V_s$ to V, significantly influences its mechanical strength, optical absorptivity, and thermal and electrical conductivity. $\theta_f$ is directly related to aggregate size using a power-law scaling relationship:

$$\theta_f \propto (R_g/a)^{D_f - 3} \qquad \text{(Equation 2)}$$

which suggests that $\theta_f$ always decreases with increasing $R_g/a$ since $V_s$ grows with a $D_f$ less than the spatial dimension.

The phenomenon of aggregation is widely accepted as a kinetic process resulting from thermal fluctuations in a given dispersion of non-repulsive monomers. Distinct mechanisms govern the formation and growth of aggregates depending on their $R_g$ and nearest neighbor separation distance ($R_{pp}$). At the onset, monomers randomly collide and irreversibly attach due to short-range forces to form chain-like aggregates with $D_f \approx 1.8$. This diffusion limited cluster-cluster aggregation (DLCA) mechanism holds as long as $R_g$ remains smaller than $R_{pp}$; the fractal nature of these non-coalescing aggregates dictates that $R_g$ always increases faster than $R_{pp}$. When $R_g$ approaches $R_{pp}$, the DLCA limit breaks down; aggregates begin to jam and gel with a morphological restructuring manifested by a $D_f$ cross-over from 1.8 to 2.5. A number of mechanisms, ranging from kinetic or dynamic arrest, phase separation, and percolation have been proposed to describe gelation. The percolation theory, owing to its simplicity, has found widespread acceptance, yet it lacks in providing a complete description of the gelation kinetics. Gelation leads to a volume-spanning network of monomers and ideally continues until the aggregate's volume reaches that of the system's with a constant $D_f \approx 2.5$.

It has been observed that increase in $R_g$ undermines the aggregate structural stability; the growth of an aggregate is arrested once its internal mechanical strength fails to balance out the external forces exerted on it. On earth-bound aggregating systems under the influence of thermal fluctuations and gravity, gel networks of monomers have been observed to irreversibly break down at $R_g/a \approx 1 \times 10^3$. This size limitation puts a constraint on the minimum experimentally realizable $\theta_f$ per Eq. 2. Theoretically speaking, an aggregate's $\theta_f$ should decrease to arbitrarily low values with a power-law exponent of −0.5 corresponding to the percolation (synonymous with gelation) regime where $D_f \approx 2.5$. However, previous studies have shown that the $\theta_f$ of aggregates subjected to weak compaction forces reaches a limiting value of 0.36±0.02 following an initial power-law decrease with an exponent of −1.2 corresponding to the DLCA growth mechanism. This scale invariance of $\theta_f$ has been observed to hold for $R_g/a$ spanning across six orders of magnitude. This confounding scaling independence and the lack of past experimental studies on $\theta_f$ in the long-range $R_g/a$ limit are areas of unresolved need solved by the present disclosure.

The present disclosure explored the scale dependence of $\theta_f$ with $R_g/a$ spanning across five orders of magnitude. In some embodiments, a novel flame aerosol reactor capable of facilitating gelation of monomers into the long-range $R_g/a$ limit ($5 \times 10^4$) via a gas-phase route was used. The reactor produced carbon monomers with an a value of ~30 nm due to high temperature combustion of a hydrocarbon precursor gas (ethylene in this case). Its unique buoyancy-opposed flame geometry eliminates the convectional outflow of monomers and traps them in a distinctive non-tipping, flicker-free, cylindrical flame body. The monomers experience enhanced residence time in the flame body, where they aggregate in a non-coalescing manner and cross-over to the gelation regime in less than a minute. Upon growing to millimeter-size, the aerosol gel particles gravitationally settle out of the flame without any structural fragmentation. The gas-phase aggregating system of the present disclosure overcomes a major limitation encountered in a colloidal wet sol-gel system: shear-induced structural breakup due to sedimentation and hydrodynamic drag. The present disclosure collected the gravitationally settled out gel particles on petri dishes and analyzed them for their $\theta_f$ and $R_g$. In another set of experiments, computer simulation of aggregation to starting with different conditions of monomer volume fractions ($\varphi$) to generate aggregates with varying $\theta_f$ and $R_g$ were performed. As a result, the present disclosure comprehensively mapped the $\theta_f$-$R_g/a$ space in the range $1 < R_g/a < 5 \times 10^4$.

Figure 14A:
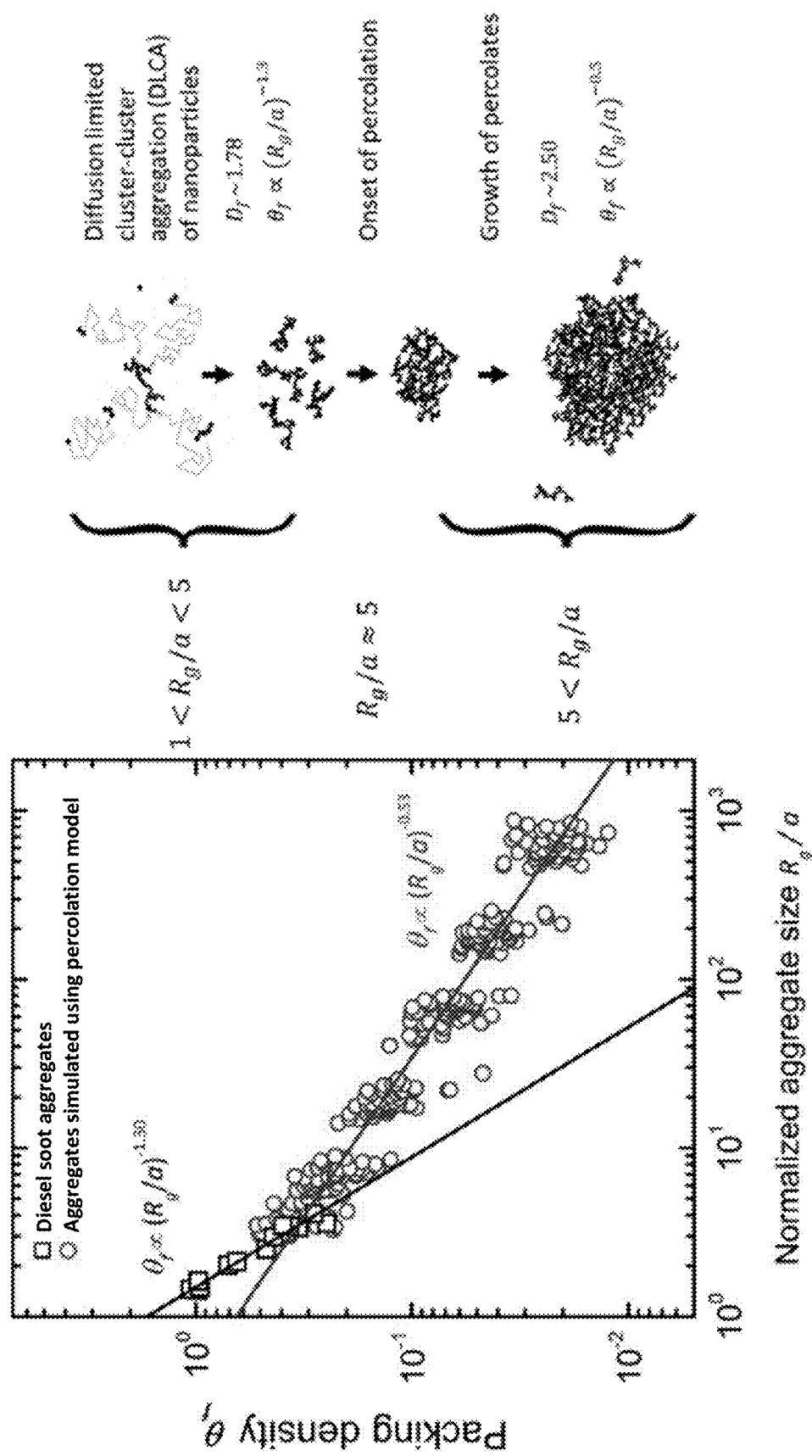
FIGS. 14A and 14B depict exemplary embodiments of the scale dependence of packing density for DLCA aggregates and percolated aggregates in accordance with the present disclosure.
Figure 14B:
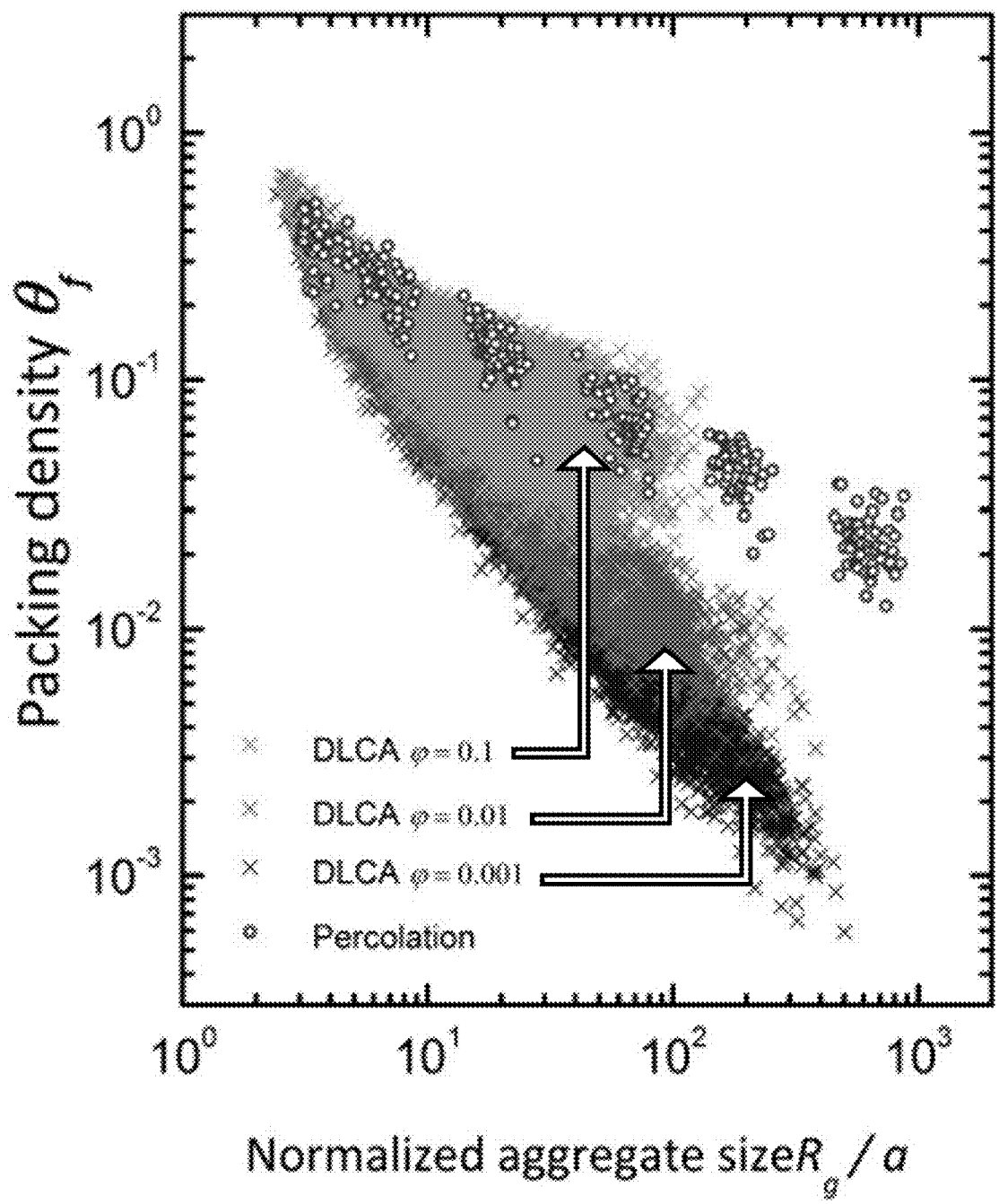

Packing densities for aggregates in the size range $1 < R_g/a < 1 \times 10^3$ are shown in FIG. 14A. FIGS. 14A and 14B depict scale dependence of $\theta_f$ for diffusion limited cluster-cluster aggregation (DLCA) aggregates and percolated aggregates (percolates). FIG. 14A depicts sub-micron size DLCA aggregates previously measured in open squares, as well as simulated aggregates in accordance with the present disclosure using the percolation model disclosed herein (open circles). Solid lines represent the scaling laws of $\theta_f$ on $R_g/a$ for DLCA aggregates and percolates, with scaling exponent of $-1.3$ and $-0.53$, respectively. FIG. 14B depicts aggregates simulated using the percolation model (open circles) and the off-lattice diffusion limited cluster-cluster aggregation model with initial $\varphi$=0.1 (upper region), 0.01 (center region), and 0.001 (lower region). The plots reveal the cross-over size from DLCA to percolation to be system dependent. Percolation is much more easily reached for a system with a higher initial co.

The $\theta_f$ for sub-micron size ($1 < R_g/a \leq 4$) aggregates was calculated based on previously published measurement datasets using a tandem differential mobility-mass analyzer setup. The $\theta_f$ versus $R_g/a$ for these aggregates scale with a power-law exponent of $-1.3$ (see FIG. 14A) following Eq. 2. This exponent implies an average $D_f \approx 1.7$ for these aggregates, which is in agreement with the value expected for DLCA growth mechanism. In the size range $4 < R_g/a \leq 1 \times 10^3$, the open circle data points were obtained from numerical simulation in accordance with the present disclosure of aggregates using the percolation model. The scale dependence of $\theta_f$ on $R_g/a$ (see FIG. 14A) in this size range showed a power-law exponent of $-0.5$, which Eq. 2 corresponds to an average $D_f \approx 2.5$—the expected value for percolation growth. The lines intercept at $R_g/a$ 4 representing the critical cross-over size from DLCA to percolation (see FIG. 14A).

FIG. 14B shows the comparison of $\theta_f$ for aggregates simulated using an off-lattice DLCA model under varying initial co conditions with those obtained using a percolation model in accordance with the present disclosure (open circles). When co is as low as 0.001 (lower region), a steeper decreasing trend of $\theta_f$ similar to that observed for experimental sub-micron size aggregates in FIG. 14B is seen. This trend suggests that in an extremely dilute sol system, DLCA governs the growth of aggregates throughout the entire size range and the cross-over to percolation is not facilitated. When $\varphi$ increases to 0.01 (center region), $\theta_f$ shows an inflection at $R_g/a \sim 20$ implying the cross-over from DLCA to percolation regime. As the initial condition becomes increasingly denser with $\varphi$=0.1 (upper region), the inflection point for $\theta_f$ becomes more pronounced and takes place at a smaller $R_g/a$ value of $\approx 10$. With further increase in $\varphi$, the tendency for the sol system is to exit the DLCA growth mechanism at $R_g/a \approx 4$ and asymptotically approach the percolation model. This series of plots shows that the critical aggregate size at the cross-over from DLCA to percolation is system dependent. Conditions for percolation, in general, are satisfied at a smaller $R_g/a$ for a sol system with a higher initial co; the theoretical minimum value being observed at $\approx 4$.

Figure 15A:
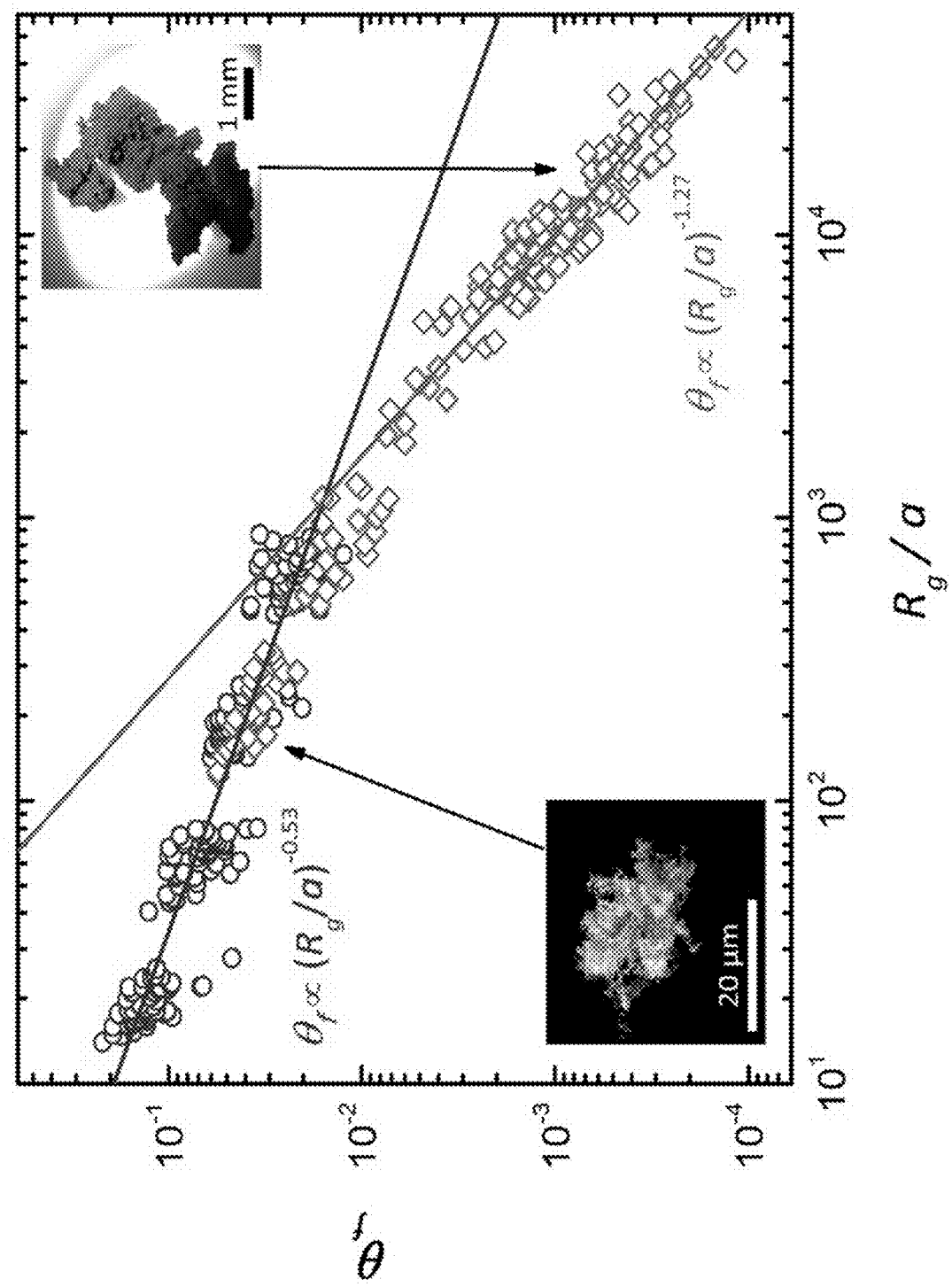
FIGS. 15A and 15B depict exemplary embodiments of the scale dependence of packing density for percolates and aggregated percolates in accordance with the present disclosure.

FIG. 15A shows the $\theta_f$ for aggregates obtained from the flame aerosol system in accordance with the present disclosure (open diamonds) within the size range $10^2 < R_g/a < 5 \times 10^4$. FIG. 15A depicts the scale dependence of $\theta_f$ for percolates and aggregated percolates. Aggregates simulated using the percolation model in accordance with the present disclosure (open circles) and carbonaceous aggregates produced from the buoyancy-opposed flame reactor system in accordance with the present disclosure (open diamonds). Solid lines represent the scaling laws of $\theta_f$ with $R_g/a$ for both forms of aggregates, with scaling exponents of $-0.53$ and $-1.27$, respectively. Electron microscopy image of a typical percolate (inset, left-bottom) and optical microscopy image of an aggregated percolate (inset, right-top) are shown corresponding to the two distinct power-law regimes of aggregation in the large size limit.

Also overlaid on this plot are the data points obtained from the percolation model in accordance with the present disclosure. It is evident that the $\theta_f$ of the experimentally obtained aggregates in the size range $R_g/a \leq 1 \times 10^2$ follows the power-law trend predicted by the percolation model. In the size range $1 \leq 10^2 < Rg/a \leq 1 \times 10^3$, the power-law trend of $\theta_f$ to gradually shift toward a new exponent of $-1.27$ was observed (see FIG. 15A). Per Eq. 2, this new exponent suggests a mechanism involving the DLCA aggregation of individual percolated aggregates (hereafter percolates). For $R_g/a > 1 \times 10^3$ the volume spanning percolates start to act like monomers and participate in a late-stage DLCA aggregation. This critical size $R_g/a = 1 \times 10^3$ is close to the previously reported ultimate limit for aggregate growth on earth. The dynamics of aggregation beyond this limit were previously unknown.

Figure 15B:
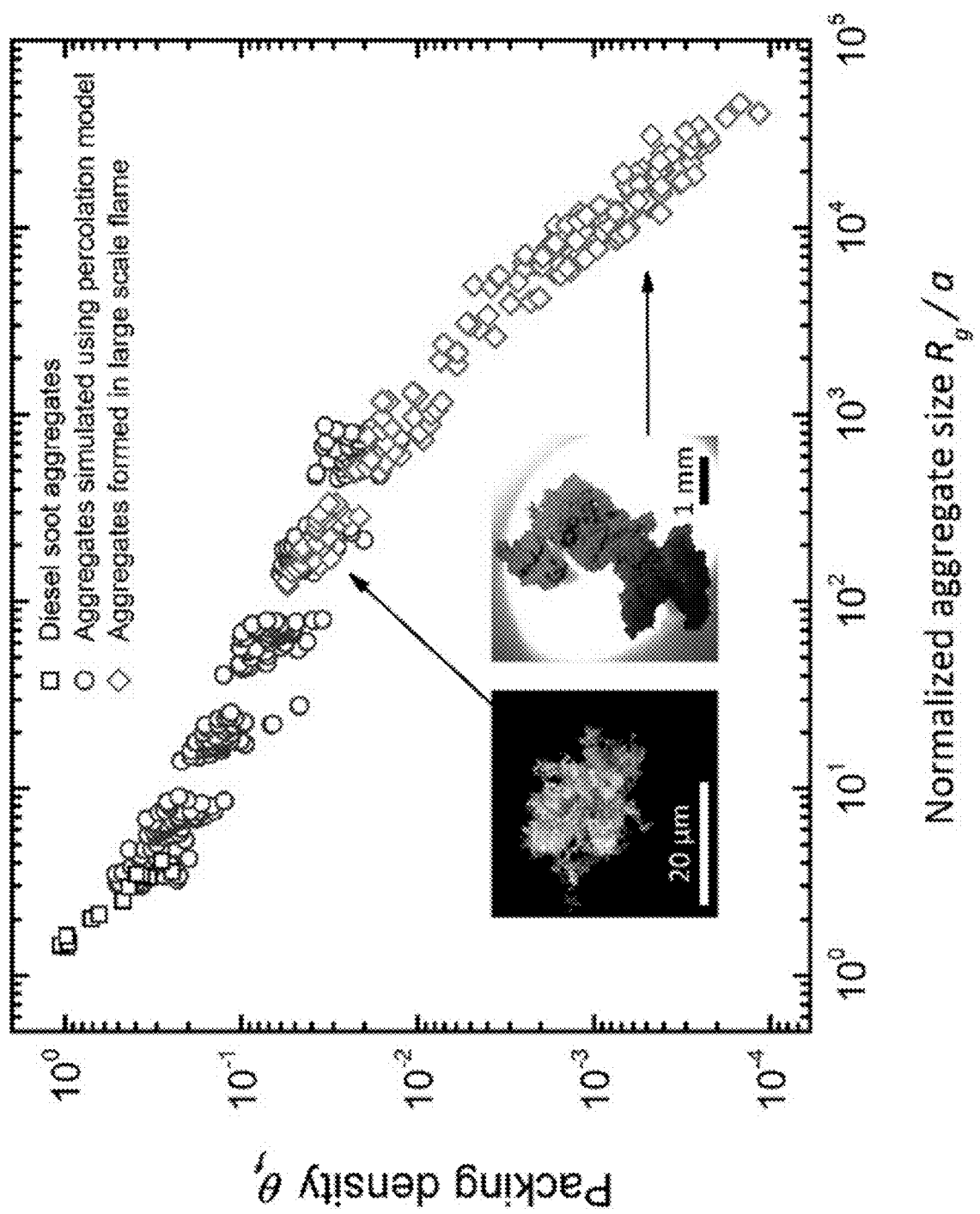

FIG. 15B depicts diesel soot aggregates (open square), aggregates simulated using the percolation model in accordance with the present disclosure (open circle), and aggregates formed in a large scale flame in accordance with the present disclosure (open diamond).

Figure 16:
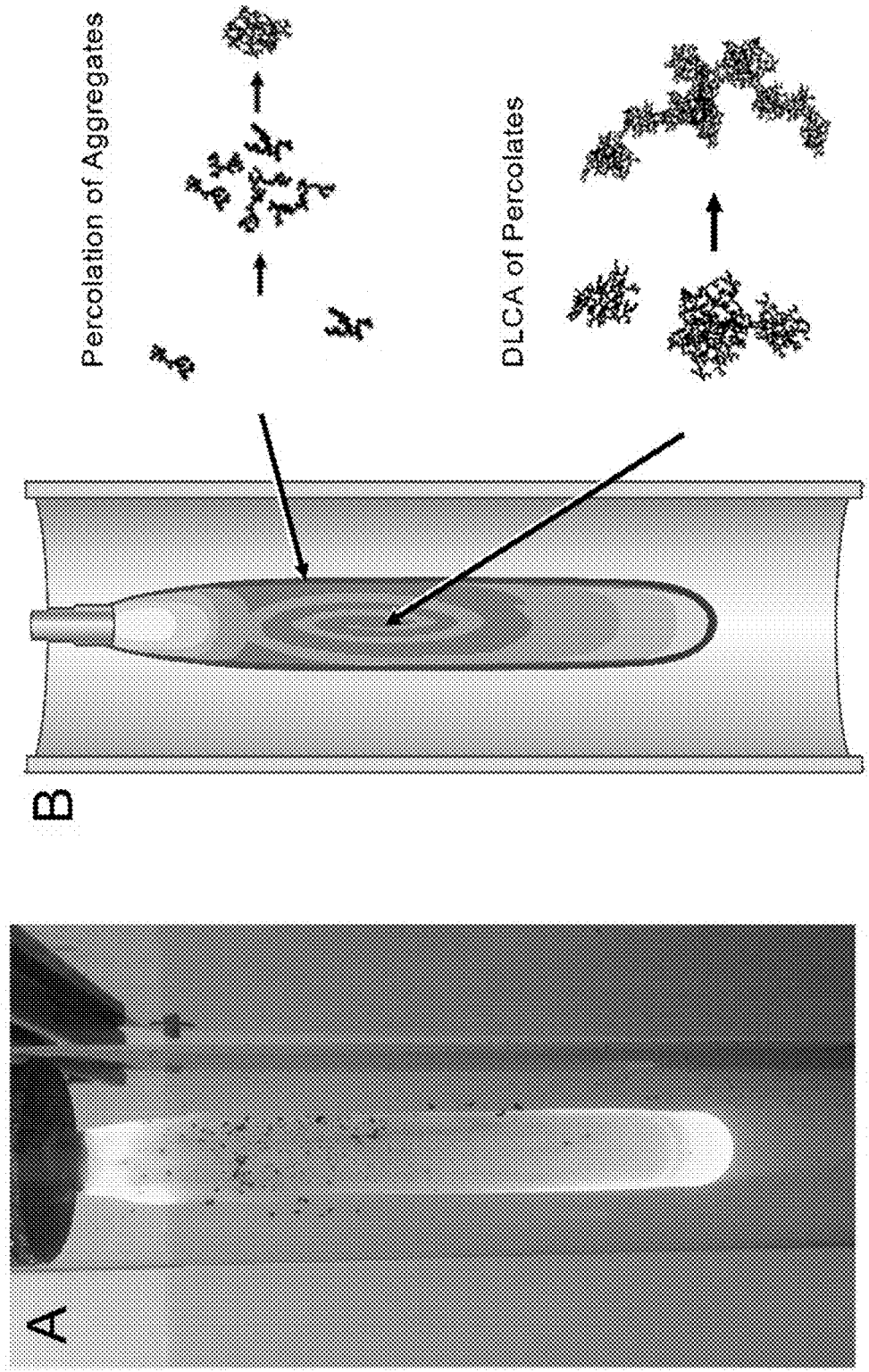
FIG. 16A depicts an exemplary embodiment of a photograph of a buoyancy-opposed flame reactor in accordance with the present disclosure.
FIG. 16B depicts an exemplary embodiment of a schematic sketch of a flame system in accordance with the present disclosure.

The present disclosure provides a phenomenological understanding of the occurrence of this late-stage aggregation of percolates, which is observed experimentally but not captured theoretically in simulations. Due to the non-homogenous spatial distribution of $\varphi$ in an aggregation system, the conditions for percolation are more readily satisfied in system space where $\varphi \geq 0.1$. This gives rise to hotspots in the system space where percolation takes place. In the flame of the present disclosure (see FIG. 16A), these hotspots were seen to be spatially spread-out across the sooting zone close to the flame front. FIGS. 16A and 16B depict percolation and aggregation dynamics in the sol system of the present disclosure. FIG. 16A depicts a photograph of the buoyancy opposed flame aerosol reactor in accordance with the present disclosure. Millimeter-size carbonaceous gel particles suspended within the flame body are discernible. FIG. 16B depicts an exemplary embodiment of a schematic sketch of the flame system in accordance with the present disclosure. Percolation of aggregates takes place at local hot spots throughout the annular layer close to the flame front, and the late stage diffusion-limited cluster-cluster aggregation of percolates takes place in the vortices located at the flame center.

Initially, the percolates grew locally in a non-interacting manner via addition of carbon aggregates into these hotspots until the cross-over size limit $R_g/a \approx 1 \times 10^3$ was reached. At this point, the percolates, whose average size was still much smaller than their average nearest neighbor separation distance, started to behave as monomeric units and diffusively collided with each other to irreversibly form macro (millimeter size) clusters. An illustrative sketch describing this dynamic is provided in FIG. 16B.

Figure 17:
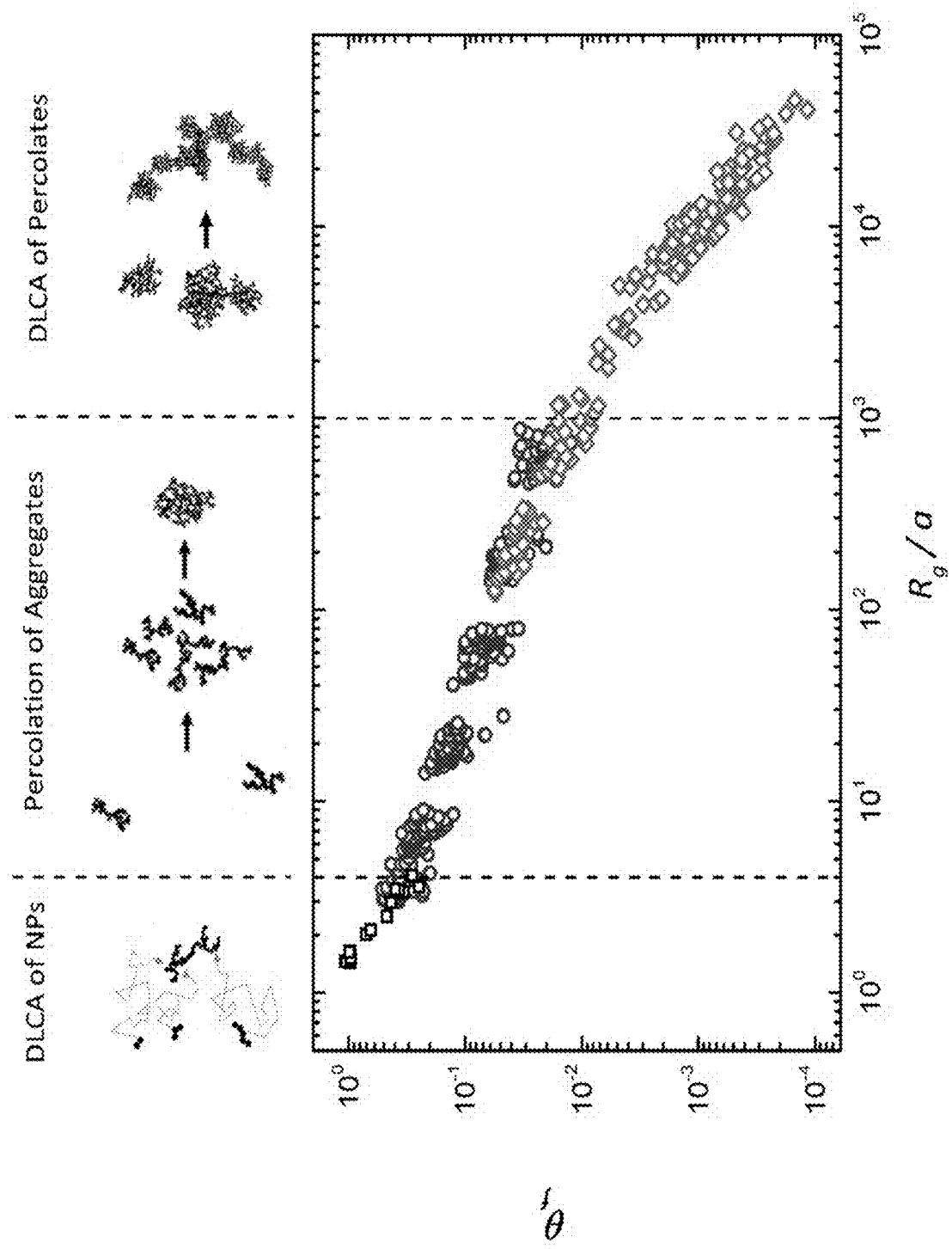
FIG. 17 depicts an exemplary embodiment of the scale dependence of packing density of aerosol gels in accordance with the present disclosure.
Figure 18:
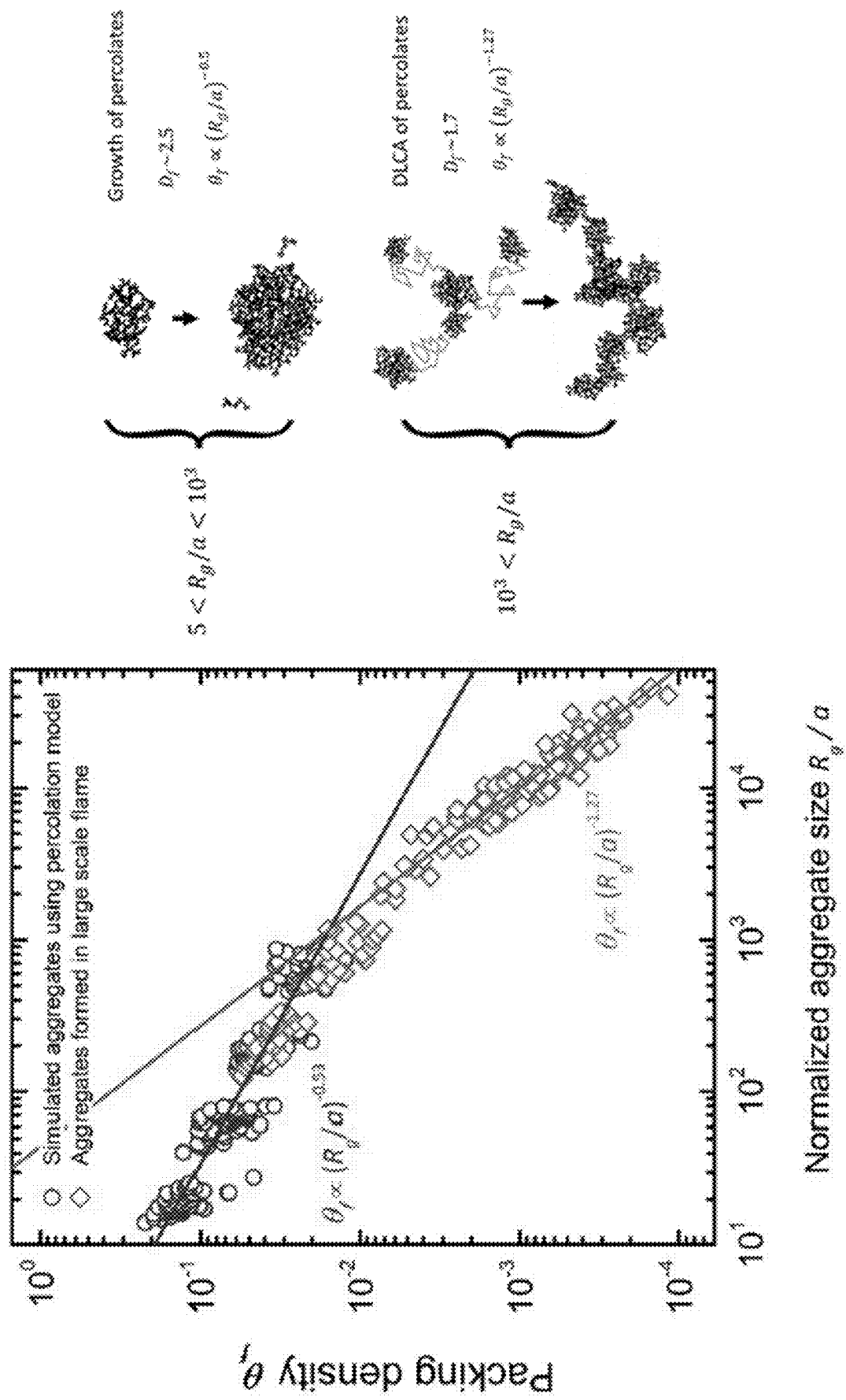
FIG. 18 depicts an exemplary embodiment of a late-stage DLCA of percolates process in accordance with the present disclosure.

A universal picture of the scaling variance for $\theta_f$ as a function of $R_g/a$ is shown in FIG. 17. FIG. 17 depicts a universal picture of the scale dependence of $\theta_f$. The $\theta_f$ of diffusion limited cluster-cluster aggregates (DLCA) of nanoparticles (open squares) decreases with a power-law exponent of about −1.3. Transition from DLCA to percolation occurs at $R_g/a \approx 4$. $\theta_f$ of percolates (open circles) with a power-law exponent of −0.5. Transition from percolation to DLCA of percolates occurs at $R_g/a \approx 1 \times 10^3$. $\theta_f$ of aggregated percolates (open diamonds) decreases with a power-law exponent of −1.3. An illustrative sketch depicting the three aggregate growth mechanisms is provided at the top of the plot.

In some embodiments, two primary mechanisms control the packing arrangements of monomers in aggregates. The DLCA mechanism operates on two different regimes of the aggregate size spectrum, separated by the percolation regime. The critical size limit of a percolate at $R_g/a \approx 1 \times 10^3$ corresponding to arrest in its local structural growth is consistent with previous predictions. The findings of the present disclosure confirm that the fractal nature holds for aggregates across five orders of magnitude of size, and therefore, challenge the scale invariant $\theta_f$ nature. The scale dependence of $\theta_f$ for aggregates in small $R_g/a$ range has implications for accurate determination of climate forcing by soot in the atmosphere. In some embodiments, the −1.3 power law scaling for aggregated percolates in large $R_g/a$ range is system dependent. The observation of this fractal scale dependence of $\theta_f$ for aggregates at extremely long-range $R_g/a$ limit has important implications for the synthesis of materials with tunable porosity, extremely low density and refractive index, and high surface area per unit volume and accurate estimation of climate forcing by carbonaceous aerosols.

Calculation of $\theta_f$ for Sub-Micron Aggregates

The $\theta_f$ of fractal aggregates is mathematically expressed as $$\theta_f = \frac{V_S}{V}. \qquad \text{(Equation 3)}$$

In this work, V is approximated to the volume of a sphere with a radius the same as that of the aggregate $R_g$ (that is, $$V = \frac{4}{3}\pi R_g^3 \bigg). \qquad \text{(Equation 4)}$$

$V_s$ is expressed as $$V_{NP} = \frac{M}{\rho}, \qquad \text{(Equation 5)}$$

where M is the mass of an aggregate and $\rho$ is the absolute density of the material constituting the aggregate. Alternatively, $V_{monomer}$ for non-coalescing fractal aggregates could be theoretically expressed as $$V_{monomer} = N\frac{4}{3}\pi a^3. \qquad \text{(Equation 6)}$$

Substituting the expressions for V and $V_{monomer}$ in Eq. 2 leads to $$\theta_f = \frac{M}{\rho \frac{4}{3}\pi R_g^3} \text{ and} \qquad \text{(Equation 7)}$$

$$\theta_f = N(a/R_g)^3. \qquad \text{(Equation 8)}$$

Previously obtained experimental data determined values of mobility diameter ($d_m$), M, a, and $\rho$ of sub-micron ($1 < R_g/a < 10$) DLCA aggregates and $\theta_f$ was calculated using Eq. 7. The $R_g$ of these aggregates was estimated from $d_m$ using the relationship:

$$\frac{d_m}{2R_g} = 1.29N^{-0.13}. \qquad \text{(Equation 9)}$$

The N of aggregates was estimated using $$N = \frac{M}{\rho \frac{4}{3}\pi a^3}. \qquad \text{(Equation 10)}$$

Simulation of Aggregates in DLCA and Percolation Regimes

Off-lattice DLCA and percolation models of the present disclosure were applied to numerically generate aggregates in the size range $10 < R_g/a < 1 \times 10^3$. The off-lattice DLCA model used herein is the same as used in a previous study. Briefly, the percolation clusters were made on a square lattice that had sites randomly filled. When filled sites were neighbors, they were considered joined into a cluster. This process repeated until the ratio of occupied sites to total sites in the lattice system reached 0.36 and the biggest percolation cluster in the system was sampled. A statistically significant number (>10,000) of numerically generated aggregates were analyzed and their $\theta_f$ values were calculated using Eq. 8. $R_g$ of the simulated aggregates was calculated as $$R_g = \sqrt{\frac{1}{N}\sum_{i=1}^{N}[(x_i - x_c)^2 + (y_i - y_c)^2 + (z_i - z_c)^2]}, \qquad \text{(Equation 11)}$$

where $(x_i, y_i, z_i)$ and $(x_c, y_c, z_c)$ are the spatial coordinates of the $i^{th}$ monomer and the mass center of the aggregate, respectively.

Synthesis of Aggregates in Percolation and Aggregation of Percolates Regimes

Figure 19:
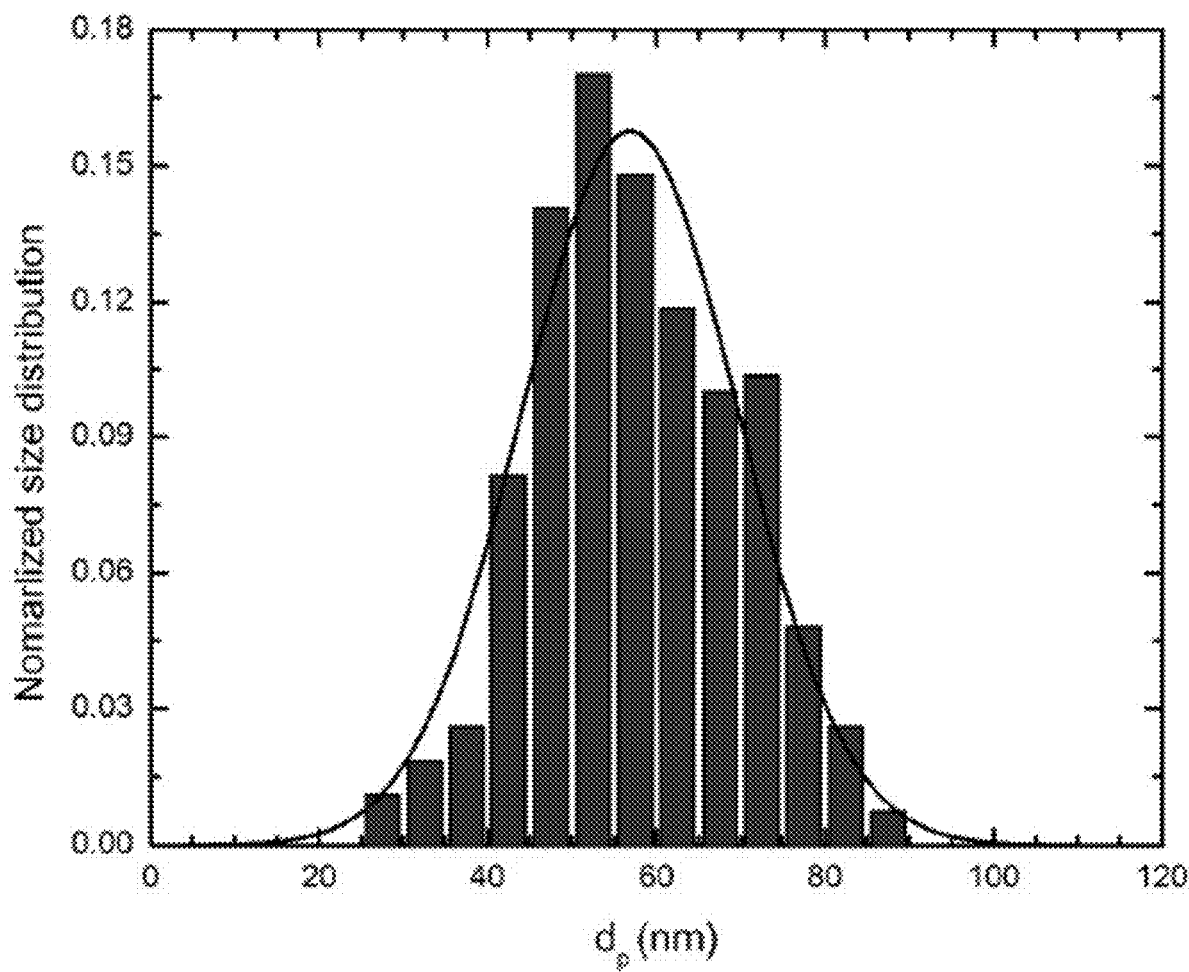
FIG. 19 depicts an exemplary embodiment of the normalized monomer distribution for flame-synthesized aggregates in accordance with the present disclosure.

A buoyancy opposed flame aerosol reactor in accordance with the present disclosure was used to synthesize aggregates in the size range $10^2 < R_g/a < 5\times 10^4$. Aggregates within the sub-range $10^2 < R_g/a < 5\times 10^3$ were sampled using a micro-analysis particle sampler (MPS-3, California Measurements Inc., Sierra Madre, USA), then imaged with a scanning electron microscope (FEI, Inc.), and later analyzed for their structural parameters using custom image processing algorithms. The $\theta_f$ values for 65 aggregates in this size range were calculated using Eq. 8. The values of a were measured from the microscopy images (see, e.g., FIG. 19). The values of N for each aggregate were estimated using the established empirical relationship $N=0.93N_{2d}^{1.16}$ (Equation 12) which holds good in the percolation regime (see, e.g., FIG. 20). Here $N_{2d}$ is the number of monomers calculated as the ratio of aggregate projected area to monomer cross-sectional area. The two-dimensional radius of gyration ($R_{g,2d}$) of aggregates were calculated from their pixelated microscopy image per the equation $$R_{g,2d} = \sqrt{\frac{1}{N_p}\sum_{i=1}^{N_p}[(x_i - x_c)^2 + (y_i - y_c)^2]},\quad \text{(Equation 13)}$$

where $N_p$ is the total number of pixels; $(x_i, y_i)$ and $(x_c, y_c)$ are the spatial coordinates of the $i^{th}$ pixel and the mass center of the aggregates, respectively, in two-dimensional projected images. Negligible deviation of $R_{g,2d}$ to $R_g$ was observed for both DLCA aggregates and percolates (see, e.g., FIGS. 21A and 21B).

Figure 23:
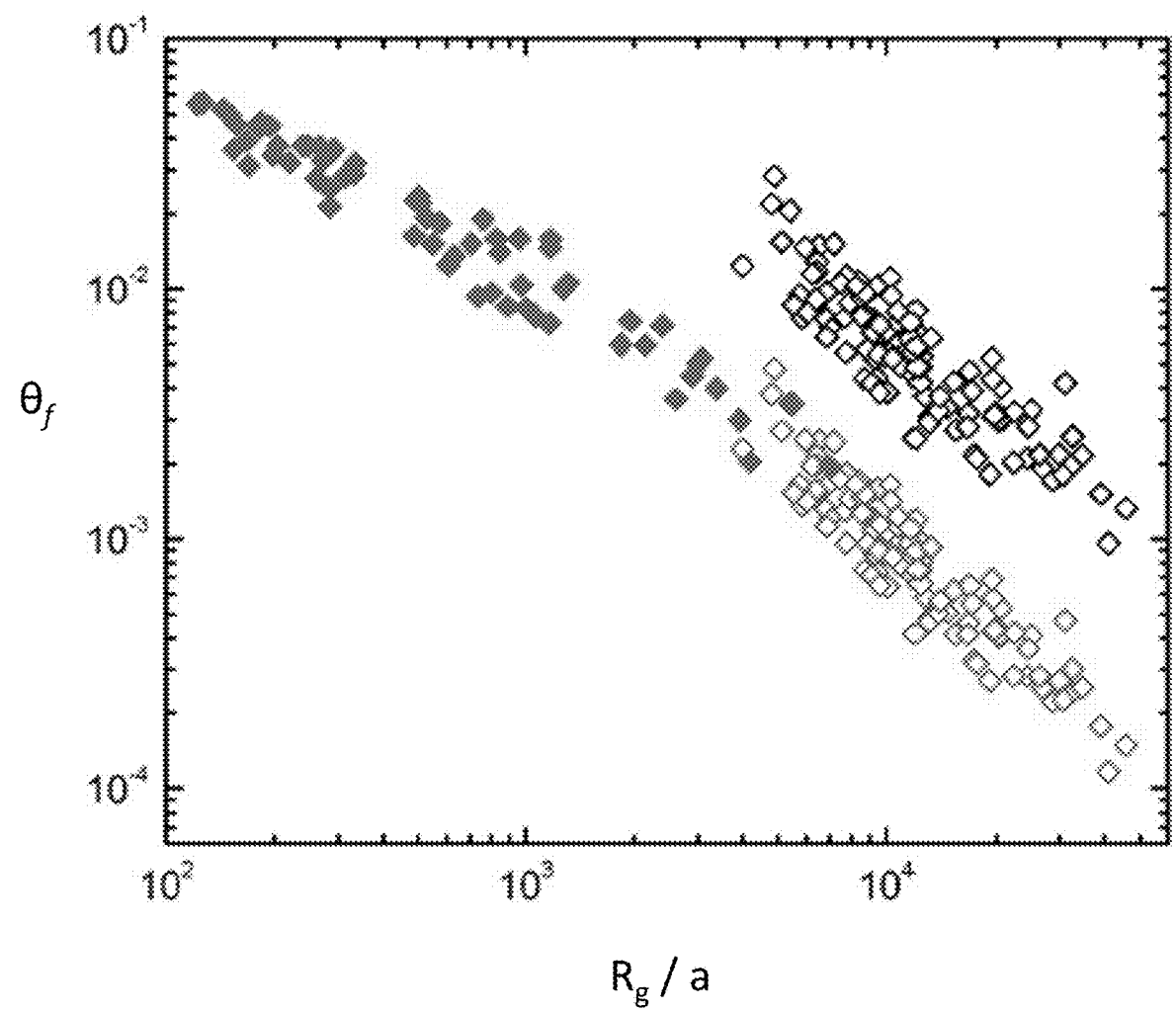
FIG. 23 depicts an exemplary embodiment of the scaling dependence of packing density for flame-synthesized aggregates in accordance with the present disclosure.

Aggregates in the size range $5\times10^3 < R_g/a < 5\times10^4$ were analyzed with a different approach. In total, 117 aggregates were collected from the flame rector and individually dropped from the top of a 400 mm tall glass drop tower with inner diameter of 70 mm. The wall effect of the tower was insignificant. The terminal settling of the aggregates under gravity were recorded using a camera (Go-Pro Hero4, San Mateo, USA) operated at 60 frames per second. The terminal settling velocity ($v_{ts}$) of aggregates was calculated from the frame-by-frame displacement of the aggregates and frame rate. Correction to the measured $v_{ts}$ was made to compensate for the effect of permeability of the porous fractal aggregates (see, e.g., FIGS. 22A and 22B). The M of fractal aggregates were calculated according to the balance between gravity and drag forces, $$M = g^{-1} 6\pi\mu R_g \left[1 + 0.158\left(\frac{2\rho_f v_s R_g}{\mu}\right)^{2/3}\right] v_{ts},\quad \text{(Equation 14)}$$

where g is gravitational acceleration; $\mu$ and $\rho_f$ are the dynamic viscosity and density, respectively, of air at standard condition (25° C. and 101.325 kpa). The $R_g$ of aggregates was obtained by processing their optical photograph similar to the approach described above. Finally, the $\theta_f$ of aggregates was calculated using Eq. 7 and the knowledge of $R_g$, M and $\rho$. The $\theta_f$ of aggregates in the size range $10^2 < R_g/a < 5\times 10^4$ was calculated using two different methodologies, image processing, and gravity-drag force balance, both of which are described above. In FIGS. 15A-15B and FIG. 17, these two sets of data were lumped together and presented using the same symbol code for convenience. FIG. 23 shows the comparison between these two data sets.

Measurement of Monomer Diameter ($d_r$) for Flame Synthesized Aggregates

The measurement monomer $d_p$ for flame synthesized aggregates was performed via processing the scanning electron microscope (SEM) image of the aggregates at 50,000 times of the magnification. The SEM images of soot aggregates were pixelated into equally spaced two-dimensional (2-d) digit arrays. The pair-pixels at the two diametrically opposite positions along the perimeter of a monomer were identified and their coordinates were recorded, from which the values of $d_p$ were calculated. There were in total 270 distinguishable monomers being measured and the distribution of monomer $d_p$ was generated, shown in FIG. 19. Next, the discrete $d_p$ distribution was fitted into a Gaussian distribution (solid line in FIG. 19) following: $dn/d(d_p)\times N_{tot}^{-1}=0.1577 \exp((d_p-56.88)^2/18.14^2)$, where $N_{tot}$ is the total number of monomers counted. The mean monomer $d_p$ is rounded to be 60 nm (monomer radius a=30 nm).

Empirical Relationship Between the Number of Monomers in the Three-Dimensional (3-d) Percolated Aggregates (N) and the Number of Monomers in Their 2-d Projections ($N_{2d}$)

Figure 20:
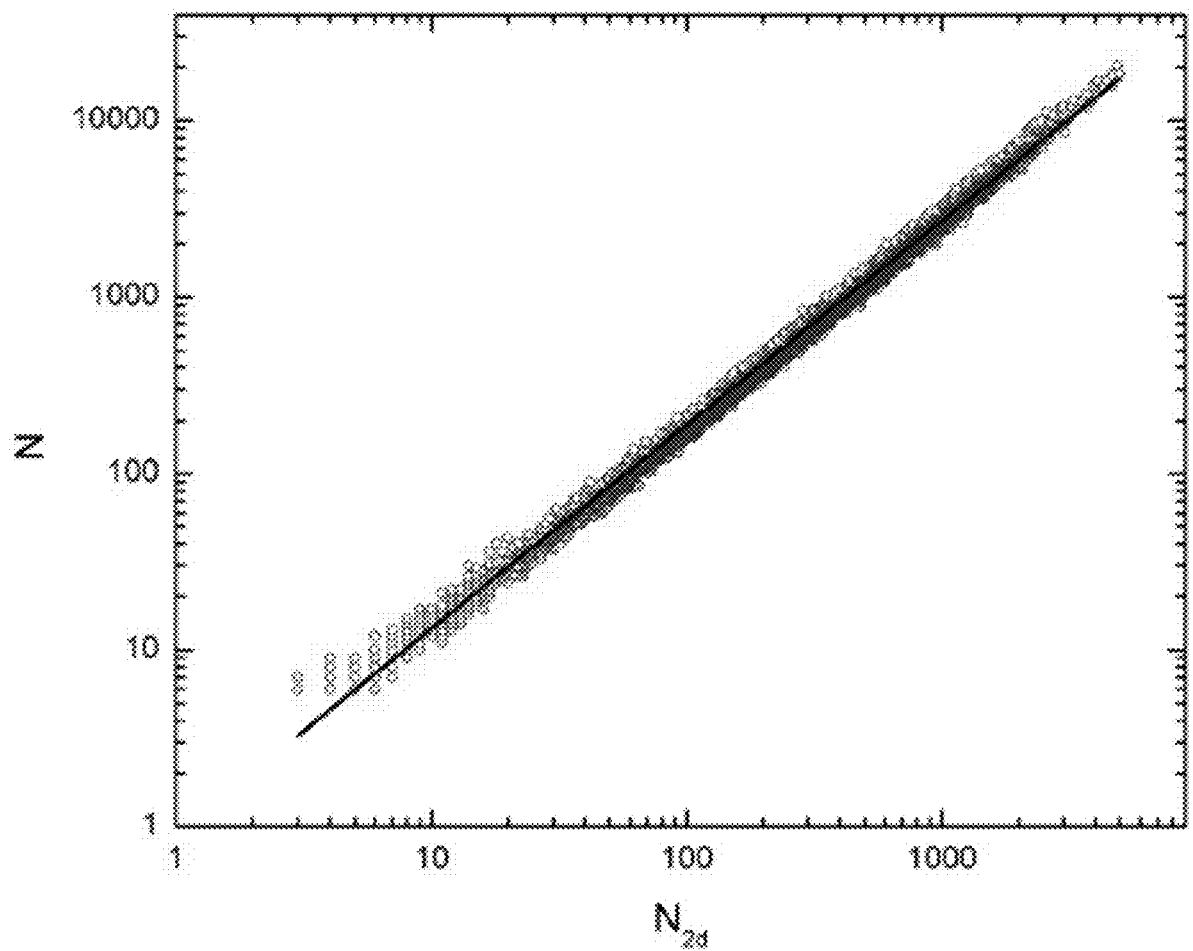
FIG. 20 depicts an exemplary embodiment of the empirical relationship for aggregates simulated using a percolation model in accordance with the present disclosure.

7,563 individual aggregates generated in accordance with the present disclosure were sampled using the percolation model and their 2-d projected images were taken from random orientations. The $N_{2d}$ values of these percolated aggregates (percolates) were obtained via dividing their projected area by monomer cross-section area. FIG. 20 shows the log-log plot of N versus $N_{2d}$ for these numerically generated percolates. The empirical relationship (solid line in FIG. 20) was obtained by fitting the data into a power-law via least square minimization. The solid line in FIG. 20 follows $N=0.93 N_{2D}^{1.16}$.

Figure 21A:
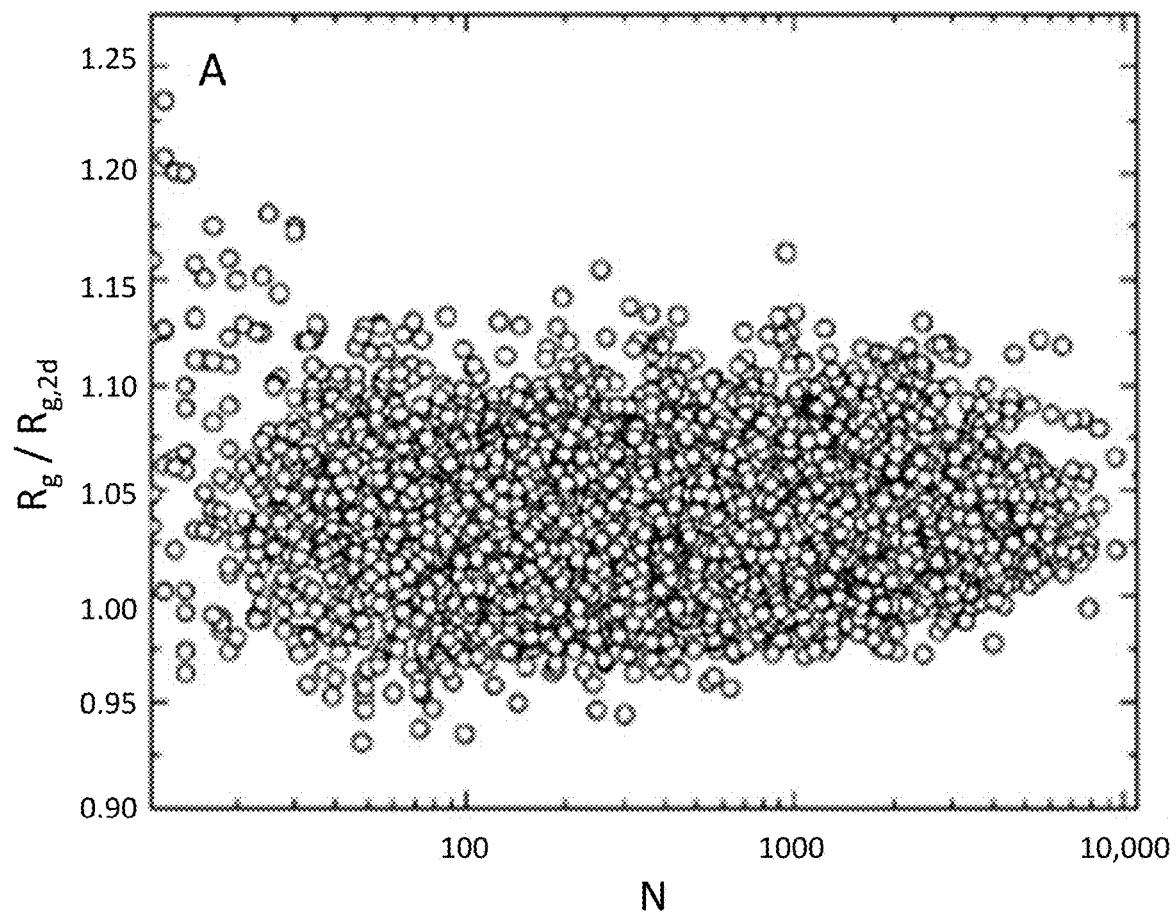
FIGS. 21A and 21B depict exemplary embodiments of aggregates simulated using a percolation model in accordance with the present disclosure.
Figure 21B:
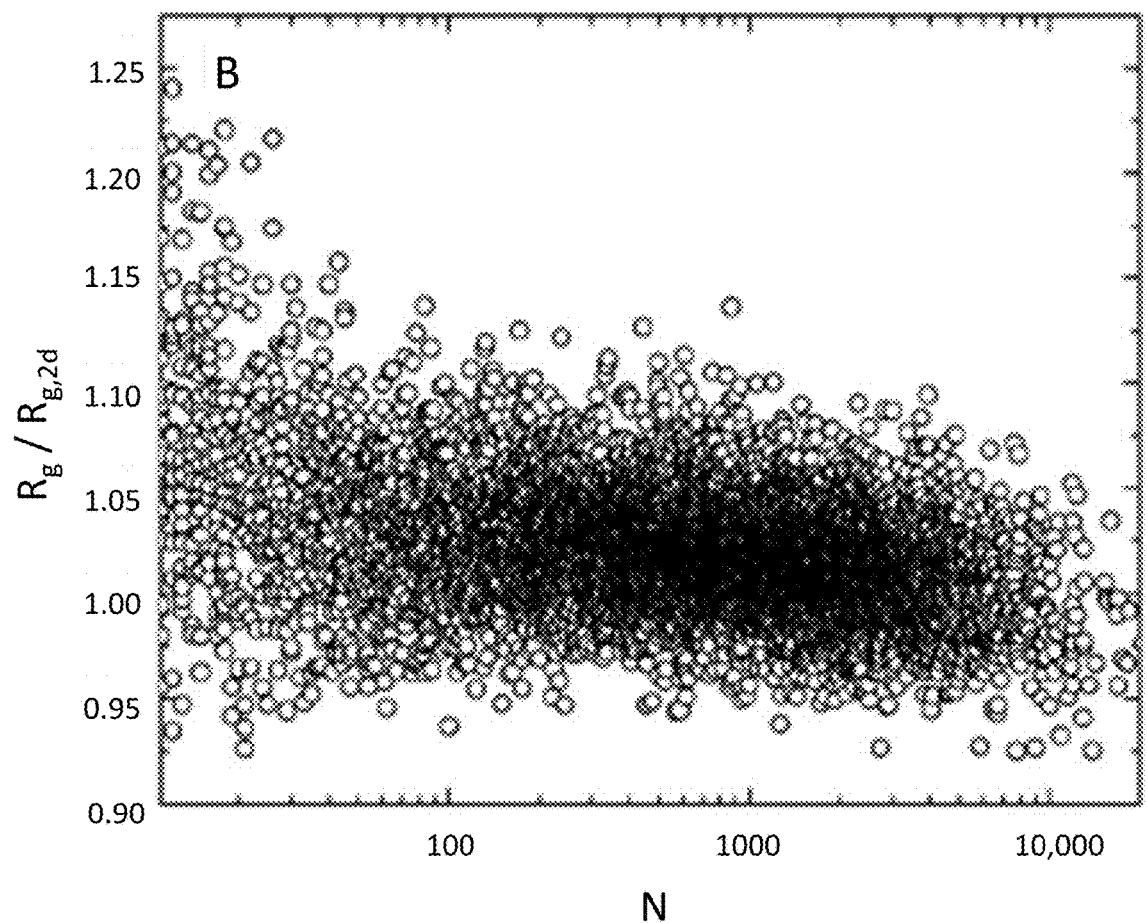

Comparison Between the 3-D Radius of Gyration ($R_g$) to 2-D Radius of Gyration ($R_{g,2d}$) for Diffusion Limited Cluster-Cluster Aggregation (DLCA) Aggregates and Percolates 9,999 individual aggregates generated in accordance with the present disclosure were sampled using the off-lattice DLCA model and 7,563 individual aggregates were generated using the percolation model in accordance with the present disclosure. The values of $R_{g,2d}$ and $R_g$ were calculated for these aggregates. The ratio $R_g/R_{g,2d}$ for DLCA aggregates and percolates are shown in FIGS. 21A and 21B, respectively, with changing N. It is observed that for both DLCA aggregates and percolates, the $R_g/R_{g,2d}$ ranges between 0.95 to 1.10 with a constant average around 1.03 which is invariant to N in the range N>100. Thus, the $R_{g,2d}$ for both DLCA aggregates and percolates can represent $R_g$ with reasonable accuracy as long as N is large enough (N>100), which holds true for the aggregates experimentally obtained in accordance with the present disclosure.

Correction of the Terminal Settling Velocity ($v_{ts}$) Accounting for Permeability of Fractal Aggregates Fractal aggregates with high porosity are permeable. When fluid flows internally through the aggregates, the drag force actually acting on them is significantly lower than the value predicted by Stokes law, which assumes particles to be non-permeable. That is, the application of Stokes law on experimentally measured $v_{ts}$ of permeable aggregates results in an over-estimation of drag force, which, in turn, results in an over-estimation of aggregates mass. Hence, appropriate corrections are needed to accurately interpret the data.

Figure 22:
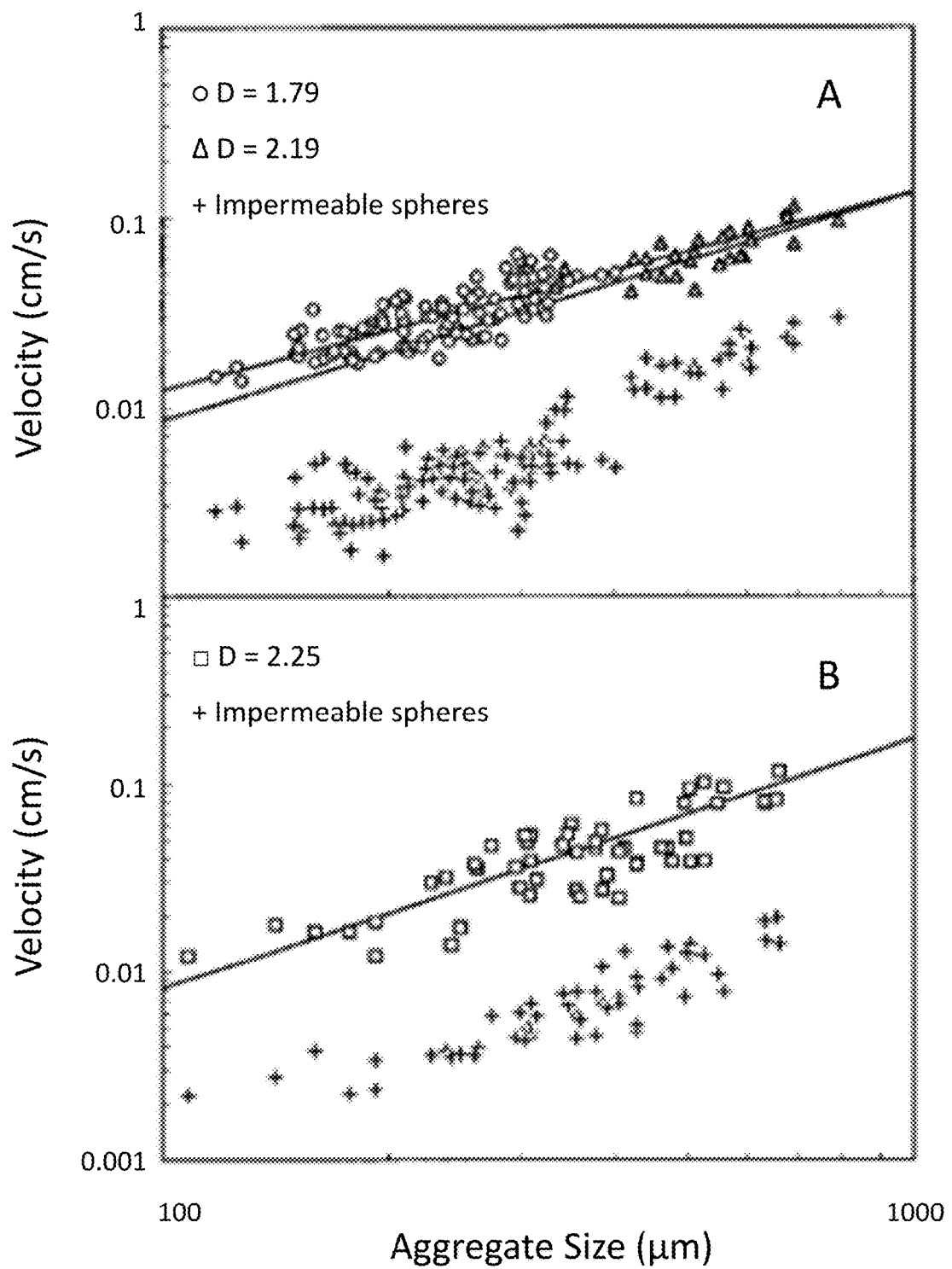
FIGS. 22A and 22B depict exemplary embodiments of terminal setline velocities of aggregates predicted using Stokes Law in accordance with the present disclosure.

Comparison between the $v_{ts}$ of permeable fractal aggregates measured via dropping experiments and those obtained from prediction of Stokes law have been previously reported. For aggregates with fractal dimension ($D_f$) of 1.8 and $R_g$ ranging between 102 and 103 µm, the experimentally measured $v_{ts}$ was found to be approximately five times greater than those previously obtained from Stokes law formulation (see, e.g. FIGS. 22A and 22B). This five-fold difference was consistently observed for a wide range of $R_g$. Following this observation, the values of $v_{ts}$ measured were divided by five before the application of Stokes law to calculate aggregate mass. The rationale behind the applicability of this empirical finding is as follows: (i) the size range of the aggregated percolates (102 µm<$R_g$<103 µm) is identical to the aggregates previously studied; and (ii) the macroscopic morphology of the aggregated percolates is reasonably close to the DLCA aggregates previously studied. FIGS. 22A and 22B depict the terminal settling velocities of aggregates predicted using Stokes law (cross) and those observed in experiments. FIG. 22A depicts aggregates with $D_f$=1.79 (open circle) and 2.19 (open triangle); FIG. 22B depicts aggregates with $D_f$=2.25 (open square).

The influence of $v_{ts}$, correction on $D_f$ of the aggregated percolates was observed to be insignificant (value of $D_f$ decreased from 1.93 to 1.73 after the correction 52 applied to $v_{ts}$). After the correction applied to $v_{ts}$, the trend of packing density ($O_f$) for aggregated percolates measured from the dropping experiment agreed remarkably well to that of percolates analyzed via microscopy image processing (FIG. 23). FIG. 23 depicts the scaling dependence of $\theta_f$ on $R_g/a$ for flame synthesized aggregates in accordance with the present disclosure. The $\theta_f$ for aggregates was sampled using MPS-3 impactor and analyzed with SEM image processing (closed diamonds). The $\theta_f$ for aggregates calculated from the drag-gravity force balance before (open black diamonds) and after (open grey diamonds) the correction of terminal settling velocity are shown in FIG. 23.

Thus, as demonstrated in the present disclosure, fractal morphology holds for NP aggregates with size spanning across five orders of magnitude. Additionally, scaling law for the $\theta_f$ of fractal aggregates followed the power-law relationship $\theta_f \propto (R_g/a)^{D_f-3}$. Further, three successive growth mechanisms controlling the evolution of $\theta_f$ were identified: DLCA of NPs, percolation of aggregates, and DLCA of percolates, with the cross-over points occurring at $R_g/a \approx 4$ and $10^3$.

When introducing elements of the present disclosure or embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several advantages of the disclosure are achieved and other advantageous results attained. As various changes could be made in the above processes and composites without departing from the scope of the disclosure, it is intended that all matter contained in the above description and shown in the accompanying drawings shall be interpreted as illustrative and not in a limiting sense.

What is claimed is:

1. A process for synthesizing an aerosol gel comprising aggregates, the process comprising:

diffusion-limiting cluster aggregating (DLCA) of at least one nanoparticle to produce an aggregate of nanoparticles;

percolating the aggregate of nanoparticles to create a percolate of the aggregated nanoparticles; and, DLCA of the percolate of aggregated nanoparticles to create an aerosol gel comprising macro-aggregates comprising particles having a diameter of from about 30 µm to about 5 mm.

2. The process of claim 1, wherein the synthesizing of the aerosol gel comprising aggregates occurs in a diffusion flame aerosol reactor.

3. The process of claim 2, wherein the reactor operates in a down-fired buoyancy-opposed configuration.

4. The process of claim 1, wherein the aggregate of nanoparticles comprises nanoparticles having a diameter of from about 30 nm to about 100 nm.

5. The process of claim 1, wherein the percolate of aggregated nanoparticles comprises nanoparticles having a diameter of from about 100 nm to about 30 µm.

* * * * *